(12) United States Patent
Cooper et al.

(10) Patent No.: US 7,565,775 B2
(45) Date of Patent: *Jul. 28, 2009

(54) VENTED ROOF AND WALL SYSTEM

(75) Inventors: John Cooper, Squaw Valley, CA (US); Woodrow Wilson, Clovis, CA (US)

(73) Assignee: Cool Building System, Inc., San Antonio, TX (US)

( * ) Notice: Subject to any disclaimer, the term of this patent is extended or adjusted under 35 U.S.C. 154(b) by 24 days.

This patent is subject to a terminal disclaimer.

(21) Appl. No.: 11/820,042

(22) Filed: Jun. 18, 2007

(65) Prior Publication Data

US 2008/0028704 A1     Feb. 7, 2008

(51) Int. Cl.
*E04B 7/00* (2006.01)
*E04H 12/28* (2006.01)

(52) U.S. Cl. .............. 52/199; 52/302.1; 52/302.3; 52/131; 52/508; 52/95; 52/72

(58) Field of Classification Search ............. 52/302.1, 52/198, 336, 302.2, 302.3, 310, 90.1, 537, 52/730.6, 302.6, 506.06, 508, 90.2, 72, 13

See application file for complete search history.

(56) References Cited

U.S. PATENT DOCUMENTS

| | | | |
|---|---|---|---|
| 5,367,848 A * | 11/1994 | McConnohie | 52/336 |
| 6,401,412 B1 * | 6/2002 | Cooper | 52/302.1 |
| 6,997,800 B1 * | 2/2006 | Kohler | 454/365 |
| 7,231,744 B2 * | 6/2007 | Cooper et al. | 52/199 |

\* cited by examiner

*Primary Examiner*—Richard E Chilcot, Jr.
*Assistant Examiner*—Chi Q Nguyen
(74) *Attorney, Agent, or Firm*—Richard A. Ryan

(57) ABSTRACT

A wall and roof venting system comprising a wall having an outer layer disposed outwardly of an inner layer with a plurality of spacers disposed therebetween to provide a wall air flow channel between the wall layers. Exterior air enters at the bottom of the wall and vented air is discharged near the top of the wall to reduce heat transfer into the building. Preferably, vented air flows into a roof air flow channel disposed between a first roof layer and a second roof layer maintained in spaced apart relation by a plurality of roof spacers therebetween. A vent component is disposed in a gap in the upper roof layer at or near the top end of the roof to beneficially disperse and/or utilize the vented air from the air flow channels. The wall and roof spacers have openings therein to permit vented air to flow through the respective channels.

16 Claims, 7 Drawing Sheets

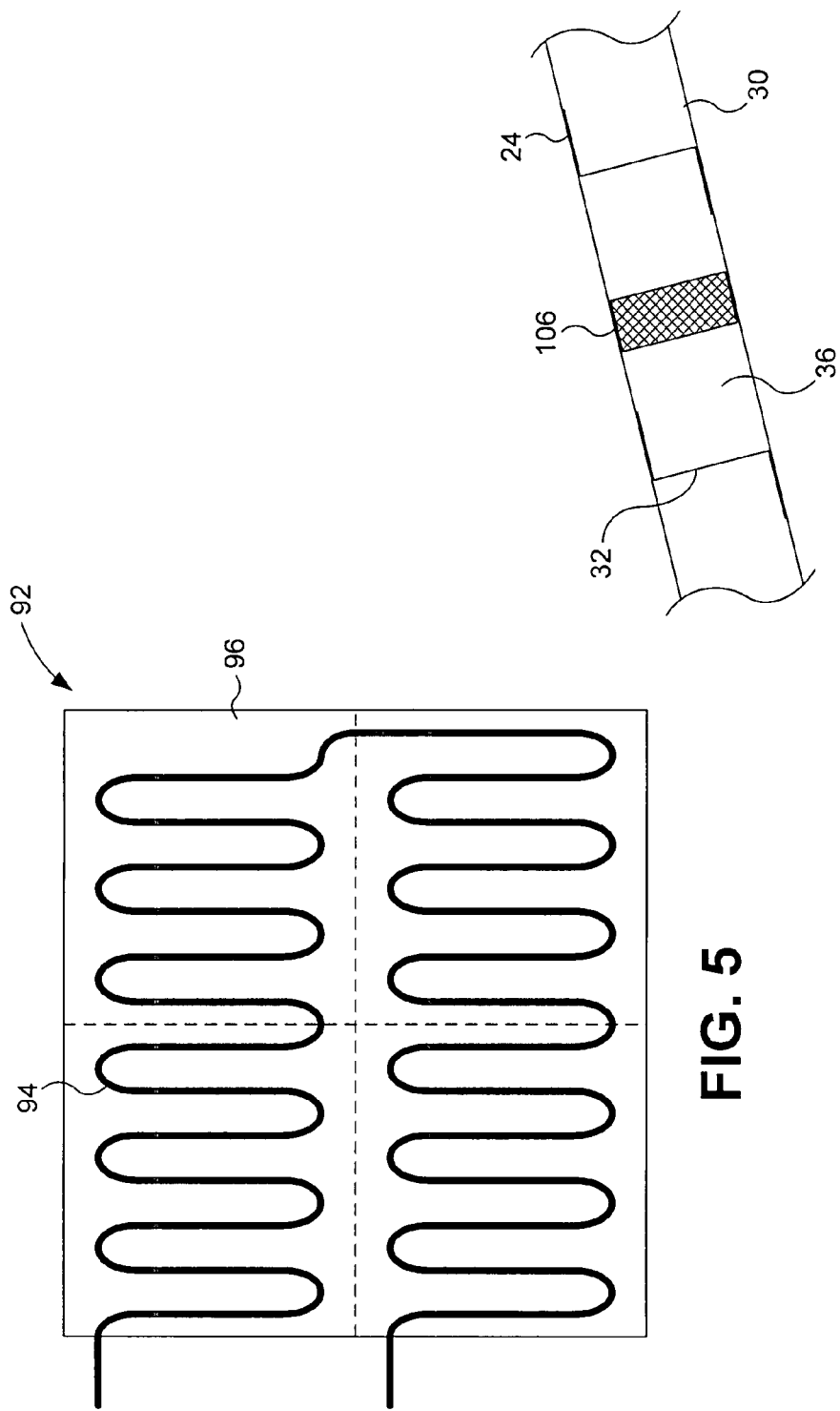

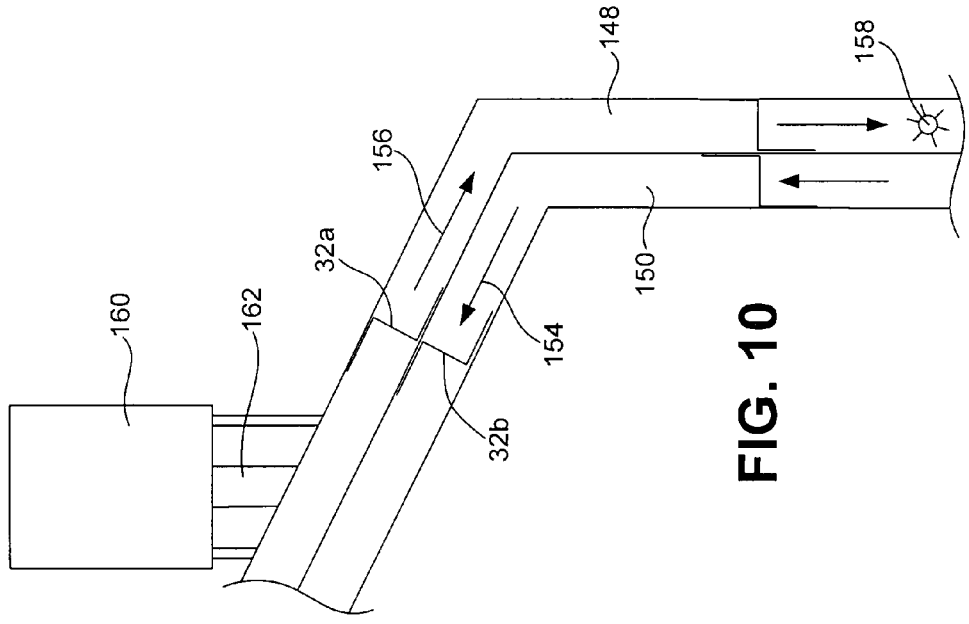
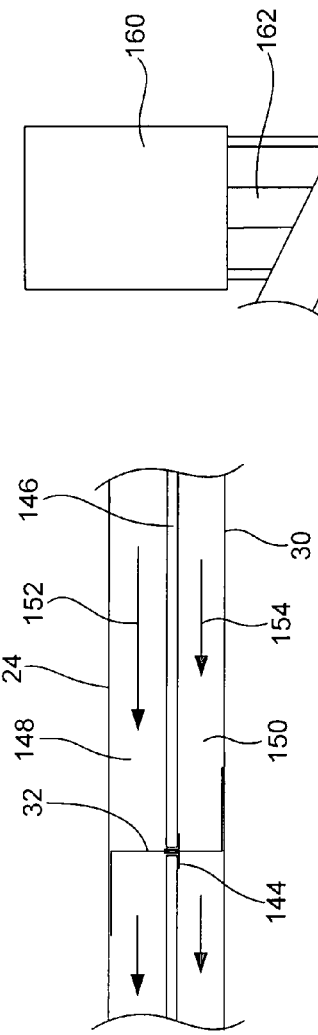
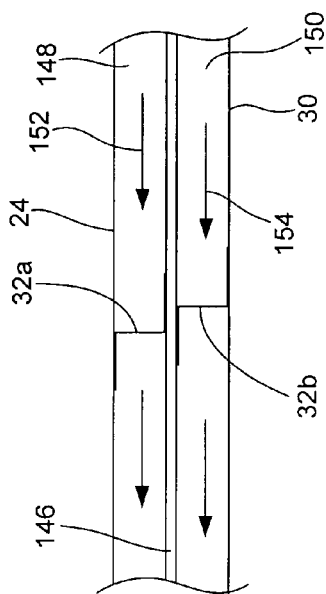

VENTED ROOF AND WALL SYSTEM

CROSS-REFERENCE TO RELATED APPLICATIONS

This application claims the benefit of U.S. patent application Ser. No. 11/134,534 filed May 20, 2005, which issued as U.S. Pat. No. 7,231,744 on Jun. 19, 2007, which claimed the benefit of U.S. Provisional Application No. 60/586,692 filed Jul. 8, 2004.

BACKGROUND OF THE INVENTION

A. Field of the Invention

The field of the present invention relates generally to wall and roof systems, particularly metal roof installations, that are configured to facilitate air circulation between layers of the wall and/or roof and vent the heated air therefrom. More particularly, this invention relates to such vented roof and wall systems that are configured to reduce the heat transfer into the structure from the roof and wall. Even more particularly, this invention is further configured to provide environmental benefits, such as improved interior air circulation and the production of hot water and electricity.

B. Background

Many structures utilize metal roof systems to protect the interior of the structure from exposure to the elements, including sun, rain, snow and the like. Metal roofs are beneficially utilized on metal, brick, wood and various other structures. Generally, the structure is built with interior columns that support a series of rafters or beams attached at the top of the columns. The roof rafters or beams are typically attached in a sloped manner with a ridge at the top or, particularly with commercial buildings, at one end of the structure to provide positive downward drainage. Spanning the rafters or beams are a series of light gauge metal Z-shaped or C-shaped structural members commonly referred to as purlins. The purlins generally run perpendicular to the rafters or beams and are configured to be in a spaced apart relationship to each other provide structural support for the overlying metal roof system.

One well known and commonly utilized metal roof system for sloped roofs comprises a decking attached to the purlins and a plurality of metal panels attached to the decking with a thermal barrier disposed between the decking and the metal panels. The decking material is attached with screws or bolts directly to the purlins that are attached to the roof rafters or beams. Most often, but not exclusively, the decking consists of a plurality of wooden panels, such as plywood, spaced side-by-side on top of the purlins. In many areas of the United States, the thermal and waterproof barrier is placed over the decking material to resist the flow of water, either from rain or snow, into the structure and to provide some degree of insulating effect for the interior of the structure. One common type of thermal barrier comprises roofing (i.e, felt) paper with a plastic covering over the roofing paper. The uppermost part of the roof, the metal panels, are attached to the decking on top of the thermal barrier. A very common type of metal panel utilized for metal roofs is the corrugated steel sheet having a plurality of spaced apart and parallel, alternating ribs and valleys. One type of such system is referred to as standing seem metal roofing, which utilizes metal roof panels having a standing rib on one side of the roof panel and a hook rib on the opposite side of the panel. The hook rib of one panel is placed over the standing rib of the adjacent panel and a machine is utilized to seam or join together the two adjacent panels by jointly folding over the hook rib and standing rib. Although the rib configuration (i.e., the shape and size) varies considerably among the many manufacturers of corrugated panels, the valleys are generally flat to form a lower plane that is spaced apart from the top of the ribs. Threaded screws are typically used to attach the metal panels to the underlying decking.

The above-described roofing system is generally sufficient to obtain a relatively strong, lightweight and weather resistant roof to protect the interior and building components of a structure. A common and well known problem with all metal roofs, however, results from the high thermal conductivity of the metal material used for the roofing. During cold weather or when snow is on the roof, the metal roof components will contract. When there is sunshine, even during cold days, the sun will heat up the upper metal panels and the air trapped between the metal panels and the decking. The heretofore standard configuration for metal roofs results in thermal expansion and contraction (i.e., thermal flexing) of the roof in response to temperature changes during the day and through the seasons. In areas of the United States where colder temperatures and/or snow conditions are common in the winter months, the thermal flexing of the roofing material is even more pronounced (particularly on the side of the roof that faces the sun). One well known result of this thermal flexing is that the threaded metal screws will back partially or completely out from the decking to which they were attached. The heating and cooling of the interior of the structure worsens this problem by creating back pressure that helps work the screw out. In addition to the obvious problem of reducing the structural integrity of the roof system, the backing out of the screws creates a conduit for moisture to enter into the space between the metal panels and the decking. Once moisture enters this area, it begins to result in the rotting of the thermal barrier and then the underlying decking, thereby damaging the roof and necessitating expensive repairs and/or retrofitting of the roof. Even without the backing out problem, moisture can build-up in between the metal panels and the decking due to the "sweating" of the metal panels from the temperature fluctuations of the air trapped therein.

Builders of structures having metal roofs have long known of the benefits of installing a vent along the roof ridge to vent out air from the attic or interior of the structure. Early vents were as simple as an open slot running along the entire length of the ridge. Later vents were developed to allow air to escape but prevent moisture and other elements from entering the interior of the structure. The ridge vents allow air to vent from the structure by convection airflow and by suction from wind blowing across the roof. Air vents added to the eave (or soffit) of the structure improved airflow by providing passive ventilation through the introduction of fresh ambient air into the attic or interior. As stale, hot air is withdrawn from the structure by convection and/or wind suction at the ridge vent, fresh ambient air is drawn into the attic or structure at the eave vent.

Other inventors have developed a variety of systems for the convection of air from structures having metal roofs. For instance, U.S. Pat. No. 5,765,329 to Huang describes roof venting system for metal roofs using two sets of corrugated metal sheets with spacers between the sheets to vent hot air to the atmosphere through a plurality of apertures in the corrugated sheets for improved heat radiation, heat insulation and the withdrawal of gasses from the interior space of the building. U.S. Pat. No. 5,826,383 to Garrison describes a roof venting system that utilizes ridge venting and eave venting to vent hot air from the interior of the building while preventing water, debris and pests from entering the interior of the building. U.S. Pat. No. 5,561,953 to Rotter describes a roof ridge ventilation system for metal roofs to allow vapors inside the building to vent out through an air permeable, resilient member located at the roof ridge. U.S. Pat. No. 5,367,848 to McConnohie describes a bracket for use to attach a new metal roof over the ribbed panels of an existing corrugated metal roof.

A metal roof system configured to solve the thermal flexing problems described above is set forth in U.S. Pat. No. 6,401,412 to Cooper (the '412 patent), one of the present inventors. The disclosure of the '412 patent is incorporated herein by this reference. In summary, the roof system described in the '412 patent comprises a lower wooden decking layer, an upper metal panel layer and a spacer disposed between the decking and metal panels. In certain parts of the United States it is advantageous to include a thermal barrier layer between the decking and the spacers to further protect the decking. The decking is generally attached to the roof rafters, or to purlins attached to the roof rafters, with the use of screws and the like, as are suitable for securely fastening the decking to the structure. Typically, the decking is made from a plurality of plywood panels laid side-by-side across the entire roof of the structure. The metal panels can comprise a plurality of corrugated metal sheets joined together side-by-side across the roof (i.e., standing seam roof system) and attached to the spacers on the decking utilizing metal screws or other fastening devices for securely fastening the metal panels to the spacer. The metal panels are joined to the spacers at the flat valleys.

In the preferred embodiment of the invention described in the '412 patent, the spacer comprises a shaped member, such as a z-shaped purlin, configured to have a generally planar top section to abut the planar surface formed by the flat valleys of the metal panels, a generally flat bottom section to abut the planar surface of the decking and a center section that vertically disposes the top and bottom sections in a spaced apart relationship. The bottom section of the spacer attaches to the decking or the rafters or purlins under the decking using the appropriate wood or metal screws. The metal panels attach to the top section of the spacer at the flat valley portions of the metal panels using metal screws or the like. The center section of the spacer includes one or more openings therein to form an airflow cavity between the decking and the metal panels. In the preferred embodiment, the center section has a plurality of openings sized and configured so as to not substantially reduce the strength and carrying capability of the spacer.

Although the roof system of the '412 patent works well to increase air flow beneath the metal roof panels and reduce the effect of thermal changes on the roof system, an improved venting system that cooperates with such a roof installation is needed to further facilitate the circulation of air so as to better obtain the benefits therefrom. As well known in the art, many commercial roofs are configured to be generally flat, as opposed to the typical home roof having a centrally disposed ridge, with only a slight degree of incline from the top or high end to the bottom or low end. Most commercial roofs have a parapet wall around the outer edges of the roof that has one or more drainage openings therein on at least the sides and the lower end to drain water off the roof, generally to the ground below. Typically, the metal roof of commercial buildings extends from parapet to parapet.

As is well known in the building and roofing industries, many modern buildings are constructed with materials and are configured in a manner that is designed to provide environmental benefits for operation and use of the building. In fact, many buildings are evaluated on the environmental friendliness of the completed structure. With regard to roof systems, many building contractors and owners desire to have a "green roof" that, in addition to satisfying the usual structure protection requirements, utilizes improved materials and systems to reduce the cost of using the building (i.e., lower electricity consumption by reducing the requirements to heat and/or cool the building interior), which also benefits the environment through reduced generation of electricity by fossil fuels or other means. Examples of such materials and systems are well known and include the use of metal (i.e., recyclable) roof panels or shingles, solar panels mounted to the roof so as to directly produce electricity, roof mounted solar heated piping systems to produce hot water for pools and hot water supply systems, and roof coverings, coatings or insulation to better insulate the roof and reduce the summer heating or winter cooling effect thereon. Metal roofs also have the advantage of a relatively high strength-to-weight ratio, which reduce the stresses on the other structure components and allows metal roofing to be used to cover old roofing materials, which reduces the need to remove the old materials and dispose of them in landfills and other disposal sites. Piping systems are also known to divert heated water through the floor of the structure so as to reduce the need to heat the structure or cool water through the floor to reduce the need to cool the structure. To assist in characterizing and evaluating the environmental performance of different structures, the United States Green Building Council (the "USGBC") developed a rating system to compare the environmental, economic, health and productivity performance of a "green building" to a conventional building. With this rating system, known as the Leadership in Energy & Environmental Design or ("LEED"), a building is evaluated with a checklist that allows the building to earn points or credits for meeting specific identified performance criteria and obtain a Leed certification level (i.e., silver, gold or platinum levels). In addition to the use of "green" materials and systems resulting in reduced operating costs for the building, a higher rating level can affect the availability of grants and/or other funding for the building. In general, the use of metal for the roof is known to contribute points toward the certification of a building as "green" under the above-mentioned standards.

In addition to providing a building that is more economical to operate, building contractors and owners generally desire to provide a structure that is healthy to live or work in. Unfortunately, for many people the interior of their home or office may not be that healthy of an environment due to the circulation of air through the building that carries dust, pollen or other allergens or pollutants. For these people specifically, and others in general, the interior air of the building in which they live or work is known to cause breathing, allergy and other health problems that can substantially reduce the quality and enjoyment of their lives. To address this concern, a number of homes, office buildings and other structures have been built with or modified to incorporate air filtration systems that are configured to remove or at least substantially reduce the dust, allergens, pollutants and other materials in the air being circulated in the building. A variety of different air filtration devices, including filter systems having HEPA or similar filters, are well known for use in cleaning the interior air of a building. Generally, these devices are placed in the stream of air coming into the building to remove the dust, allergens, pollutants or other materials therein so that a substantially clean stream of air can be circulated inside the building.

One area of the building that has been generally not addressed with regard to improved environmental performance is the exterior wall. Although a variety of exterior wall materials have been developed to provide long life and, to some extent, reduce the heat transfer into the building, wall systems have not changed much over the years. Despite the fact that much of a building's exposure to the elements along the walls of the building, specific systems for reducing the heat transfer into the building through the wall are not generally commercially available.

What is needed, therefore, is an improved venting system for roof installations, particularly metal roof installations, and for walls that tie into such roof systems, particularly those utilized on commercial buildings and the like. It is particularly desirable to provide a venting system for roofs and walls that is configured to cooperate with an air circulating/venting system, such as that described in the '412 patent or which is otherwise utilized. The preferred venting system should be configured to more beneficially vent the air from between an upper layer of roofing material and the lower layer of roofing materials, such as between metal roof panels and the underlying wood sheathing, and from between an outer wall layer and an inner wall layer. The system should be relatively simple to install and not add substantially to the cost of the typical roof and wall systems. In an even more preferred system, a vented roof and wall system is desired that utilizes the vented air for purposes of improving the air circulated to the interior of the building, providing hot water for use in or around the building and to provide a source of electricity for the building.

SUMMARY OF THE INVENTION

The improved vented wall and roof system of the present invention provides the benefits and solves the problems identified above. That is to say, the present invention discloses a wall and roof venting system for metal and other types of roof installations, that can be utilized with roofs having an air circulation system incorporated therein, such as that described in the '412 patent, and which is effective at venting air from the roof system. The venting system of the present invention is adaptable to new wall and roof installations and is both relatively simple and economical to install. In one configuration, the wall and roof venting system better vents the heated air from between the outer and inner wall layers and from between the upper and lower roof layers to reduce the problems that are known to be associated with thermal flexing. In the preferred embodiment, the wall and roof system is configured to utilize the vented air for purposes of supplying a better quality (i.e., cleaner/filtered) air to the interior of the building, providing heated air that assists in warming water passing through a roof piping system, which is preferably configured to also be heated by the sun, to supply hot water for use in or near the building, and generating electricity for use in or near the building. In a preferred configuration, due to the known air circulation that results, the upper roof layer is a metal panel or shingle system and the lower layer is a wood sheathing, such as plywood or the like, that is separated by a plurality of generally Z-shaped spacers. Alternatively, various other materials can be utilized for the upper and/or lower roof layers. In a preferred configuration of the wall system, the outer siding layer is separated from the sheathing by a plurality of generally Z-shaped spacers. In the preferred configurations for both the wall and roof systems, a radiant barrier is disposed between the upper/outer and lower/inner layers.

In one general aspect of the present invention, the roof venting system is configured for a roof having a top end, a lower end, a first side and a second side with a lower roof layer, an upper roof layer and one or more spacers, such as the Z-shaped members disclosed in the '412 patent, disposed between and interconnecting the lower roof layer and the upper roof layer. The spacers configured to maintain the upper roof layer in spaced apart relation to the lower roof layer and provide an air flow channel therebetween. A gap is provided in the upper roof layer generally at or near the top end of the roof for placement of a roof vent component. As set forth below, the roof vent component is generally configured to beneficially disperse and/or utilize the vented air that flows upward from the bottom end of the roof toward the top end of the roof through the air flow channel. In one configuration, the roof vent component comprises a vent support member enclosing the gap and one or more vents attached to the vent support member for venting the vented air to the environment from the air flow channel. One or more fans can be installed on the upper roof layer, generally near the bottom end of the roof and in fluid flow communication with the air flow channel, to discharge outside air into the air flow channel. In the preferred embodiment, the roof vent component comprises a roof piping system having one or more pipes that configured to receive water from a source of water, such as a municipal water supply or a well. The roof piping system is placed in fluid communication with the air flow channel so that the vented air will pass across the pipes. Preferably, the roof piping system is particularly configured to facilitate the transfer heat from the vented air to the water in the pipes to produce hot water for use in the structure or elsewhere. The roof piping system can discharge the hot water to one or more storage tanks and/or to a floor piping system to heat the floor and, therefore, the interior of the structure. Also in the preferred embodiment, the roof has a translucent section configured to allow heat from the sun to heat the pipes of the piping system and the water carried thereby. A water filtration apparatus is hydraulically interconnected with the piping system to filter and/or treat the water before and/or after it is heated in the piping system. In one embodiment, the vented air is vented out vents after heating the pipes in the piping system. In the preferred embodiment, a vent collector at the top end of the roof is configured to direct the vented air into a duct system for distribution as interior air. Preferably, the vented air is filtered by an air filter apparatus prior to distribution as interior air. For use in the winter, the heated air is directed into the structure's interior to heat the interior. In the summer or warmer months, the vented air is cooled by an air cooling apparatus prior to distribution as interior air. In another embodiment, the roof vent system includes an electrical generating apparatus in fluid flow communication with the vented air.

In another general aspect of the present invention, a wall venting system is provided that, preferably, discharges vented air flowing therethrough into the roof venting system for discharge or use thereby. In one embodiment, the wall venting system comprises an inner wall layer and an outer wall layer that are maintained in spaced apart relation by a plurality of wall spacers disposed therebetween to define a wall air flow channel. In the preferred embodiment, the wall spacers are generally Z-shaped members that have holes therein to allow the vented air to flow from the bottom of the wall to the top of the wall. The exterior air enters the wall air flow channel at or near the bottom of the wall through a wall intake vent. The vented air flowing through the wall air flow channel can be discharged out the top of the wall or directed into the roof air flow channel to be beneficially dispersed or utilized by the roof vent component.

In yet another general aspect of the present invention, either or both the roof and wall air flow channels are provided with a rigid member that defines an inner air flow channel and an outer flow channel. Air convection through both of the inner and outer air flow channels further reduces the amount of heat transfer from the exterior of the roof or wall to the interior of the building. The dual air flow channels can be provided by utilizing a single roof or wall spacer with the rigid member being disposed between pairs of adjacent spacers or they can be provided by utilizing a first spacer between the rigid member and the inner layer and a second spacer between the rigid member and the outer layer of the roof or wall. If desired, a vane apparatus can be utilized to generate electricity in response to the flow of air through one or more channels. Alternatively, flowing water from a source of water can be utilized to rotate the vane apparatus and generate electricity.

Accordingly, the primary objective of the present invention is to provide a wall and roof venting system that provides the advantages discussed above and overcomes the disadvantages and limitations associated with presently available wall and roof venting systems.

It is also an important objective of the present invention to provide an effective and economical wall and roof venting system for use with metal and other roof installations that is adaptable to those installations which are utilizing a roof air circulation system, such as that described in the '412 patent.

It is also an important objective of the present invention to provide a wall and roof venting system that improves the environmental, economic, health and productivity performance of the building as a whole so as to provide a more "green" building than is obtainable with conventional wall and roof systems.

It is also an important objective of the present invention to provide a wall and roof venting system for metal and other roofs that is reasonably straightforward and economical to install.

It is also an important objective of the present invention to provide a wall and roof venting system that is configured to direct the vented air for use with systems that provide clean and/or cool air to the interior of the building, hot water for use in the building and/or electricity for use in the building.

It is also an important objective of the present invention to provide a roof venting system that comprises an air flow channel disposed between an upper roof layer and a lower roof layer with a fluid piping system disposed in the air flow channel and configured such that the vent air heats the fluid in the pipes, a thermally translucent section in the upper roof layer disposed generally above the fluid piping system to heat the fluid in the piping system, an air filtration system to filter the vented air before discharging the air into the interior of the building, a cooling system to cool the air prior to discharge into the building and/or an electrical production mechanism to utilize the thermal properties of the vented air to produce electricity.

It is also an important objective of the present invention to provide a wall and roof venting system that comprises an air flow channel disposed between an inner and outer wall layer, separated by a plurality of spacer members, that connects to an air flow channel disposed between an upper roof layer and a lower roof layer, also separated by a plurality of spacer members, so as to receive air into the wall system and vent heated air out of the roof system so as to reduce heat transfer into the building, thereby providing a generally more environmentally friendly or "green" building.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention:

FIG. 5 is a top plan view of a floor having a floor piping system for use with the roof venting system of the present invention for heating or cooling the interior space of the structure;

FIG. 6 is a side view of a upper and lower roof layers with an air filter disposed in the air flow channel therebetween;

FIG. 8 is an isolated side view of an alternative configuration for the vented wall and roof system of the present invention showing the use of a spacer having brackets to support a rigid thermal layer defining two air flow paths;

FIG. 9 is an isolated side view of another alternative configuration for the vented wall and roof system of the present invention showing the use of a upper/outer and lower/inner spacers, separated by a rigid thermal layer, to define the two air flow paths;

FIG. 10 is an isolated side view of an alternative configuration for the vented wall and roof system of the present invention showing use of two air paths, with one of the air paths being used to vent air and the other being utilized to generate electricity from water flowing therethrough.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures and drawings are merely illustrative of the preferred embodiments and represent several different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For purposes of this disclosure, references are generally to use of the present invention with the metal roof system of the '412 patent, however, it is understood that the disclosure herein applies to other roof systems, whether made from metal or other materials, that utilize similar components or configurations to allow air to circulate between layers of the roof system, such as between an upper roof layer comprising metal panels and a lower roof layer comprising plywood sheathing.

Figure 1:
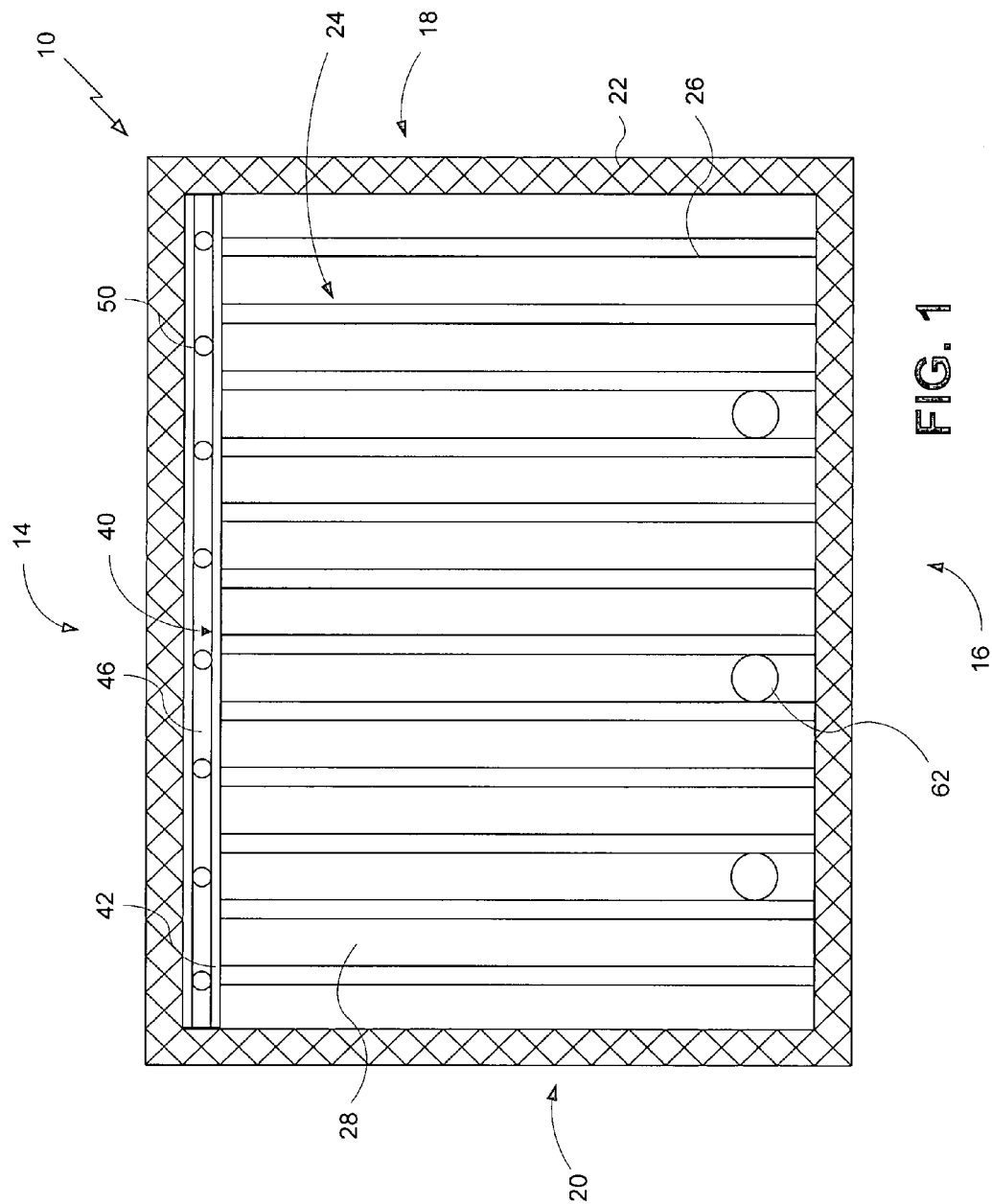
FIG. 1 is a top view of a metal roof installation incorporating the venting system configured according to a preferred embodiment of the present invention.
Figure 2:
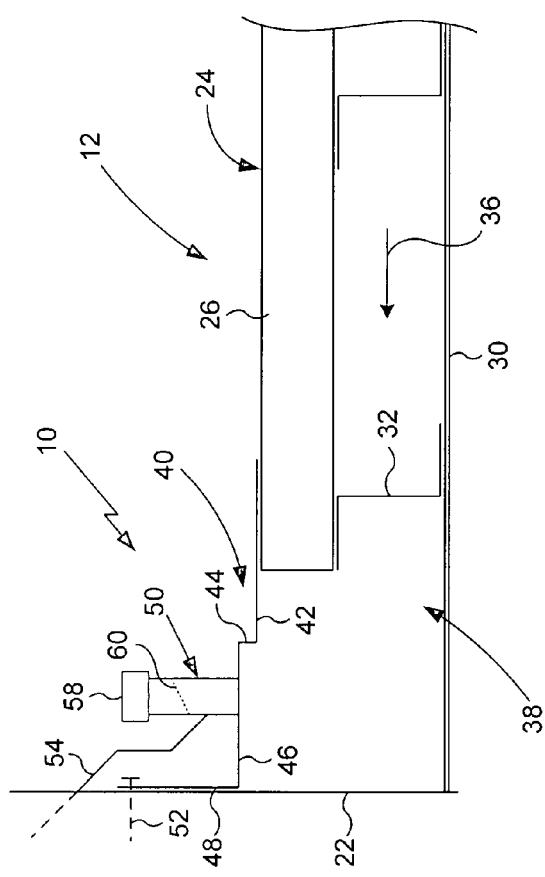
FIG. 2 is an isolated side view of the roof installation showing the components of the venting system of FIG. 1 in use with a roof circulating system configured according to that described in the '412 patent.
Figure 3:
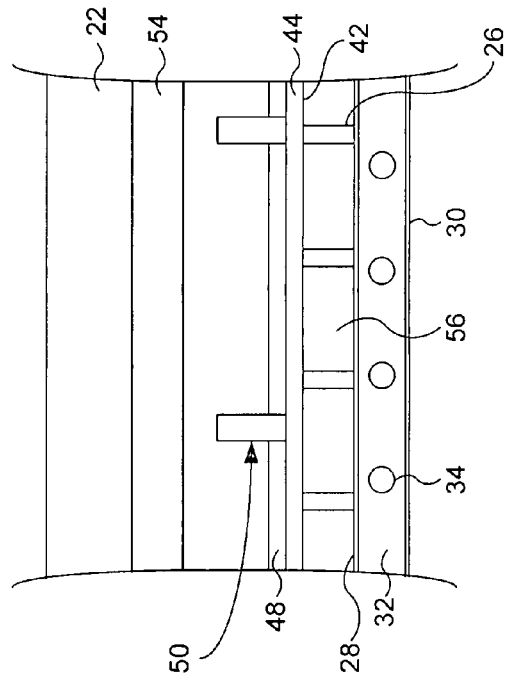
FIG. 3 is a view of the roof installation from just below the venting system showing the components of the venting system of FIG. 1 in use with a roof circulating system configured according to that described in the '412 patent.

A venting system for roof installations that is installed out of the components and configured pursuant to the present invention is shown generally as 10 in the figures. In the embodiment shown in FIGS. 1 through 3, venting system 10 is configured for metal roof 12 and is shown in use on a commercial building having high or top end 14, an opposite low or bottom end 16 and opposing first side 18 and second side 20. A portion of the building's wall, referred to as the parapet 22, is disposed around the outer periphery of the building and extends above the roof. Upper roof layer 24, which in the embodiment shown in FIGS. 1 through 3 is comprised of a series of adjacent metal roof panels having a plurality of ribs 26 and valleys 28 between the ribs 26, is disposed in spaced apart relation above lower roof layer 30, which in the configuration shown is comprised of a plurality of plywood wood sheathing members. As well known by those skilled in the art, lower roof layer 30 is fixedly attached to the roof supporting structure, such as rafters or purlins attached to rafters (not shown). To obtain the most benefits from the present invention, venting system 10 is generally disposed at or near top end 14 of roof 12. As described in the '412 patent, a plurality of roof spacers 32, such as z-shaped members having holes 34 (shown in FIG. 3) in the vertical portion thereof, are disposed between and generally interconnect lower roof layer 30 and upper roof layer 24 to maintain the two layers in a spaced apart relation and to provide an air flow channel 36 therebetween which allows air to flow upward (i.e., generally from bottom end 16 to top end 14) between the lower 30 and upper 24 roof layers. In prior art roof installations, the metal panels or other members of upper roof layer 24 extend all the way to parapet 22 at top end 14 of the building. In the present invention, upper roof layer 24 does not extend the entirely to parapet 22, thereby providing a gap 38 between upper roof layer 24 and parapet 22 at top end 14. As shown in the figures and described in detail below, a roof vent component is generally disposed in gap 38 and configured to beneficially handle (i.e., vent) or utilize the vented air in air flow channel 36 to provide the improved roof venting system 10 of the present invention.

As best shown in FIG. 2, in one configuration of venting system 10 the roof vent component comprises a vent support member 40 positioned in gap 38 between the end of upper roof layer 24 and the parapet 22 at top end 14. In a preferred embodiment, vent support member 40 is an elongated section of sheet metal that extends along the entire length (i.e., generally from first side 18 to second side 20) of top end 14 of roof 12 and which comprises an overlap section 42, a first upstanding section 44, a center section 46 and a second upstanding section 48. In the preferred embodiment overlap section 42 is generally planar, however other non-planar configurations can also be utilized, and configured to extend over the end of upper roof layer 24, as shown in FIG. 2, a sufficient distance to provide support therefor and reduce the likelihood of water intrusion underneath. First upstanding section 44 is a short generally vertical section that interconnects overlap section 42 with center section 46. Center section 46 interconnects first upstanding section 44 and second upstanding section 48 and is configured to support vent pipe 50. Second upstanding section 48 is disposed in a generally vertical configuration or perpendicular to center section 46 and disposed in a generally abutting relationship with parapet 22. Although a preferred embodiment of vent support member 40 is configured as described above, those skilled in the art will recognize that numerous other configurations for vent support member 40 are also possible. In one configuration, overlap section 42 is of sufficient length to provide a twelve inch overlap, center section 46 is four inches long and second upstanding section 48 is six inches high. In a preferred embodiment of venting system 10 of the present invention, a connecting member 52, such as a nail or screw, is used to secure second upstanding section 48 to parapet 22.

To prevent water or debris from getting between second upstanding section 48 and parapet 22, the preferred embodiment of the present invention also utilizes a flashing member 54, as shown in FIG. 2, that is attached to parapet 22 and extends over the top of second upstanding member 48. Various glues or other adhesives can be utilized to attach the upper end of flashing member 54 to the parapet 22. Preferably, flashing member 52 is configured to extend generally downward so as to prevent water or debris from getting between second upstanding section 48 and parapet 22. Flashing member 54 can be configured with one or more angles, as shown, to provide the desired coverage. In one embodiment, the upper end of flashing member 54 extends partially into parapet 22 to provide a more secure attachment to parapet 22. To prevent water or debris from entering into roof installation 12 beneath overlap section 42, a waterproof barrier or other device can be utilized at the end of overlap section 42. In addition, it may be preferable to utilize one or more securing mechanisms, such as screws, rivets or other connectors, to secure overlap section 42 to upper roof layer 24 at or near the end at top end 14.

As shown in FIG. 3, because the ribs 26 of the roof panels that make up upper roof layer 24 run generally perpendicular to overlap section 42 and are displace approximately two inches above the valley 28 of the metal panel, a plurality of small openings 56 will result. Each opening 56 will be framed by overlap section 42 on the top, a pair of generally parallel ribs 26 on the sides and the valley 28 between the pair of ribs 26 on the bottom. To prevent water or debris from getting into the roof installation 12, it will generally be necessary to block of each of openings 56 with a small section of sheet metal or other material (not shown).

Positioned on center section 46 at various intervals along the length of vent support member 40 between first side 18 and second side 20 are a plurality of vents 50 to vent air away from inside roof installation 12 (i.e., that air which flows in air flow channel 36 between lower roof layer 30 and upper roof layer 24 through the openings 14 in spacers 32) in the embodiment of the air circulation system described in the '412 patent. Generally, vents 50 will be disposed above gap 38 to vent air therefrom. In one configuration, vents 50 comprise a small section of cylindrical tubular pipe approximately 6 inches high and approximately 2½ inches in diameter. As those skilled in the art will readily know, other configurations for vents 50 are also possible. As also known to those skilled in the art, it is generally best for vent 50 to be at least minimally angled at the point where vent 50 attaches to center section 46 of vent support member 40. To prevent water, debris or pests from entering roof installation 12, vent 50 can be provided with a screen cover 58 and a flapper-type of mechanism 60 that maintains the vent in a closed condition unless air is being discharged from venting system 10.

To facilitate the flow of vent air in air flow channel 36 in roof installation 12 and the discharge of the vented air to the roof vent component (i.e., vent support 40 and vents 50) of venting system 10, the preferred embodiment of venting system 10 includes at least one fan or other air blowing mechanism 62 located on upper roof layer 24 near bottom end 16, as shown in FIG. 1. A hole (not shown) can be cut into the valley 28 of the one or more roof panels that make up upper roof layer 24 to allow the fans to be in fluid-flow communication with air flow channel 36 between the wood sheathing of lower roof layer 30 and the metal panels of upper layer 24. Fan 62 is configured to pull air into the roof installation 12 from the atmosphere and discharge air into air flow channel 36 so as to cause air to flow out vents 50 located near top end 14. An example fan 62 is a 800 cfm solar powered air pulling fan that has a motor disposed inside a fan housing positioned on upper roof layer 24 which is connected to a source of electrical power, such as one or more solar panels or the building electrical system. Preferably, fan 62 includes a light sensitive switch that is configured to activate fan 62 in the sunlight and deactivate it at night (to prevent moist night air from being pulled into roof installation 12). Alternatively, fan 62 can include other timing mechanisms. As stated above, depending on the size of the building and the need to vent air from roof installation 12, venting system 10 can comprise a plurality of such fans 62.

Figure 4:
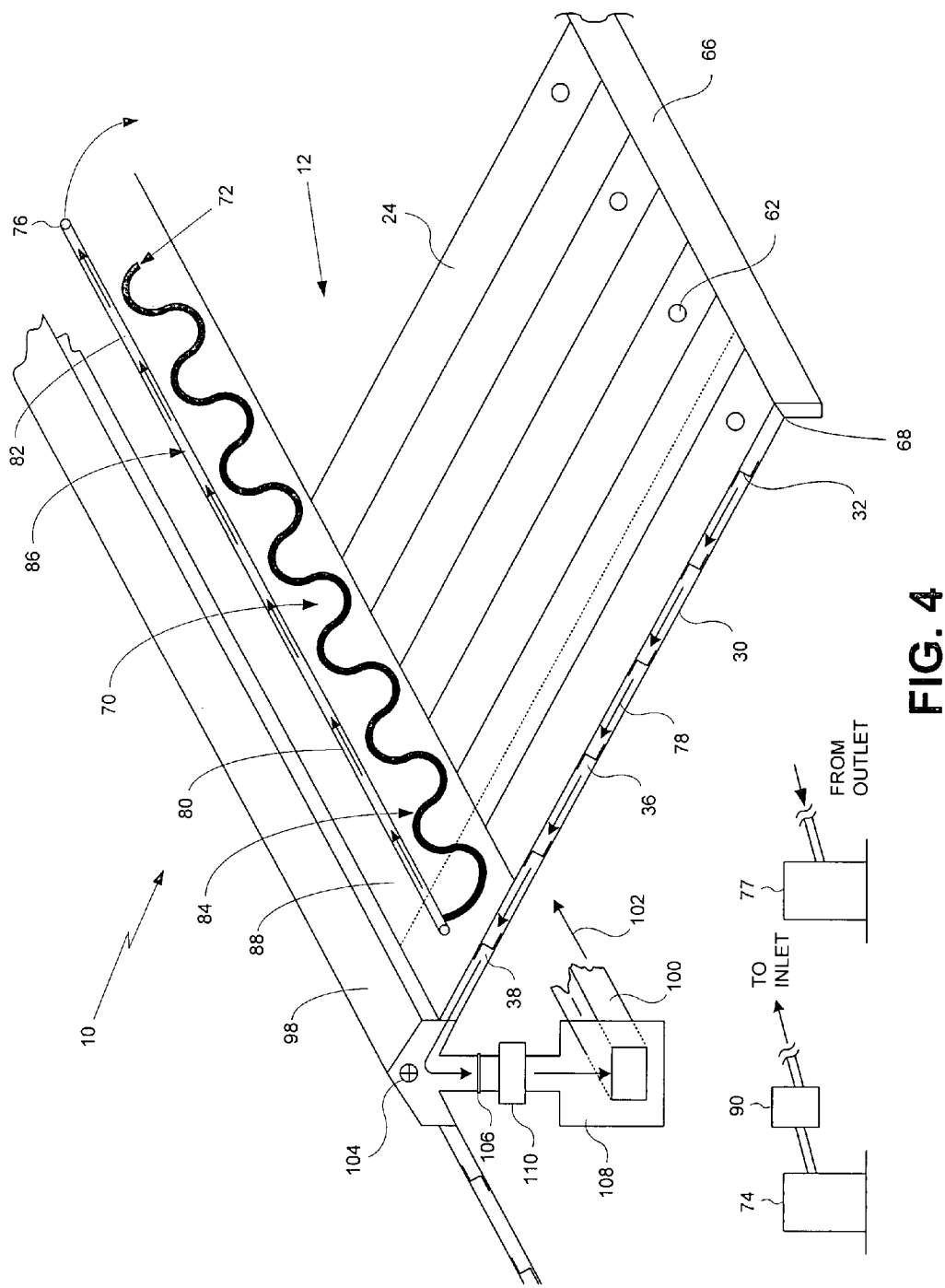
FIG. 4 is a perspective view of a preferred embodiment of the roof venting system of the present invention showing use of a piping system to heat water and an air distribution system to provide quality air to the interior of a structure.

The preferred embodiment of the roof system 10 of the present invention is shown in FIGS. 4 through 6. As set forth in more detail below, in this embodiment, roof 12 is particularly configured for improved environmental, health and economic purposes by including systems to generate hot water, cleaner interior air, cool interior air and/or electricity. Roof 12 includes a facia member 66 at the bottom end thereof that includes an intake vent 68 in the eave for air flow into air flow channel 36. In a first configuration of this embodiment, the roof vent component comprises a liquid flow piping system 70 having an inlet 72 connected to a supply of water, shown schematically as 74 and can comprise a municipal water system or a well, and an outlet 76 that is connected to a hot water distribution system in the structure or a liquid storage unit 77, such as a hot water heater tank located in the structure (as shown) or a tank or other storage unit outside the structure. Piping system 70 is disposed in air flow channel 36, preferably in gap 38 at or near top end 14 of roof 12, such that the vented air, shown as 78, will flow over and across piping system 70. The water flowing in piping system 70, shown as 80, will typically be ambient or cold water. As described above and in the '412 patent, the vented air 78 will be substantially warm or hot and conductively transfer some of its heat to the water 80 flowing in piping system 70. To assist in this transfer, it is preferred that the pipes 82 that make up piping system 70 be manufactured out of materials that are somewhat conducive to the heat transfer between the vented air 78 and water 80. As well known in the art, certain metals, such as copper and aluminum, certain thermoplastics, glass and other materials are well suited to the efficient transfer of heat from vented air 78 to water 80. Various configurations for pipes 82 in piping system 70 can be utilized to accomplish the desired results of the present invention. As shown in FIG. 4, piping system 70 can comprise a first curvilinear section 84 and a second straight section 86 to provide additional flow path for water 80 to pass through to obtain the desired warming. Alternatively, piping system 70 can comprise either curvilinear section 84 or straight section 86 or one or more of each. Piping system 70 can also be configured in separate, interconnected segments for ease of and/or reduced cost of installation. In one configuration, pipe 82 used for curvilinear section 84 can have a diameter of two to four inches and pipe 82 used for straight section 86 can have a diameter of three to four inches. Numerous other configurations for piping system 70 are suitable for use with the venting system 10 of the present invention.

In use with the venting configuration shown in FIGS. 1 through 3, the hot vented air 78 will flow through air flow channel 36 from bottom end 16 to top end 14, assisted by fans 62 if desired, and pass across pipes 82 of piping system 70 to heat the water 80 passing through pipes 82, which will be discharged through outlet 76 for use in the structure (if desired), and then be vented to the environment through vents 50 on vent support member 40. As set forth in more detail below, water 80 discharged through outlet 76 may be too hot for regular home hot water uses, such as washing, showering and the like. If so, the water 80 discharged from piping system 70 should either be allowed to sit in a tank, such as tank 77, or be mixed with cold or cool water until cooled sufficiently for the typical home uses. For commercial buildings, including multiple unit dwellings and manufacturing plants, the heated water 80 from piping system 70 may be able to be utilized without such storage or mixing. As an example, laundries, restaurants and other facilities that utilize significant amounts of hot water may be able to benefit greatly from this supply of hot water 80. As will be recognized by those skilled in the art, the venting system 10 described above and hereinafter will be able to substantially reduce the costs associated with providing heated water for the building owner or operator of the facilities used therein.

For improved hot water production, the roof vent component of the roof venting system 10 of the present invention further comprises a thermally translucent section, shown as 88, disposed generally above piping system 70 so as to allow sunlight to contact pipes 82 of piping system 70. In a preferred embodiment, upper roof layer 24 ends before top end 14 and translucent section 88 covers gap 38 in which piping system 70 is positioned. Translucent section 88 can be made out of a variety of materials, such as glass, tempered glass and plexiglass, that allow a substantial amount of the sun's solar heating therethrough so as to provide additional heat, in addition to that from vented air 78, to warm the water 80 flowing through piping system 70. To facilitate this heating, it is preferred that pipes 70 be made out of materials that best transfer heat or be coated with material to facilitate such heat transfer. As an example, black PVC pipe or copper pipe painted black can be utilized for pipes 82. As another example, piping system 70 can comprise various new composite or other materials, such as the crossed-linked polyethylene material Aquapex® from Uponor Wirsbo. As will be recognized by those skilled in the art, care must be taken to select materials for piping system 70 and translucent section 88 that will provide long life, generally resistant to weather and sunlight, are suitable for use above the house and will not easily break or shatter upon contact (i.e., a baseball against translucent section 88). In a preferred embodiment of this configuration, translucent section 88 extends from first side 18 to second side 20 of the roof 12 and is sufficiently wide to substantially expose all of gap 38 and/or piping system 70 therein to sunlight. In one configuration of the present invention, a residential home would have a width of two feet and a commercial installation would have a width of four feet. The material utilized for translucent section 88 can be approximately ¼" to ⅜" thick. As is understood by those skilled in the art, the dimensions of translucent section 88 can be substantially varied and still accomplish the objectives of the present invention.

To improve the operating life of piping system 88 and the quality of water provided to the homeowner, manufacturer or other owner/operator of the structure on which venting system 10 of the present invention is utilized, a water filtration apparatus 90 is included therewith. As shown in FIG. 4, water filtration apparatus 90 can be disposed between the source of water 74 and inlet 72 so as to provide suitably pure water for the water 80 in piping system 70 to reduce the likelihood or prevent corrosion of pipes 82. As known to those skilled in the art, however, it is generally not necessary or even desirable to utilize perfectly pure water, which under certain circumstances can actually increase the rate of corrosion of pipes 82. In an alternative configuration, water filtration apparatus 90 is located after outlet 76 to filter the water exiting piping system 70 before it is used in the structure or stored in tank 77. Various types of filtration apparatuses are suitable for water filtration apparatus 90 of the present invention, including reverse osmosis, ultra violet light, chemical and other filtering systems. In addition, water filtration apparatus 90 can comprise or include a water softener mechanism that reduces corrosion and the likelihood of calcium buildup in piping system 70.

As discussed above, water 80 from outlet 76 can be utilized for the typical home hot water uses, such as showering, baths, cleaning and the like, or utilized for various commercial purposes, including laundry facilities, dish washing, equipment cleaning, processing and the like. A known use for water 80 from venting system 10 is to pass the water through a floor piping system 92, as shown in FIG. 5. As known in the art, floor piping system 92 comprises a plurality of floor pipes 94, such as the crossed-linked polyethylene material described above, embedded in the floor 96 of the structure. Hot water passing through the pipes 94 heat the floor and radiates up through the floor, warming the interior of the structure. As shown in FIG. 5, floor piping system 92 can be divided into one or more sections to allow the user to control the heating of the floor in various rooms or sections of the structure and to avoid excessive heat loss from having to travel the entire length of pipes 94. Floor piping system 92 can be connected to a environmental control system to facilitate this control. Typical floor heating systems use hot water from the hot water heater or other conventional hot water supply systems. In the preferred embodiment of the present invention, floor piping system 92 receives hot water 80 from piping system 70, thereby substantially reducing the cost of producing the water necessary to effectively heat floor 96 and the interior of the structure. As such, the venting system 10 of the present invention will provide an additional environmental benefit of lowering the usage of natural gas, electricity or other fuel source for heating the water for floor piping system 92. An additional benefit, achievable with floor heating systems in general is that they reduce the amount of dirt, dust, allergens or other materials in the interior air of the building by reducing or even eliminating the need for hot blowing air to heat the structure. In the warmer, summer months the floor piping system 92 can be used to pass cool water through floor 96 to assist in cooling the interior of the structure.

If a conventional heating system is utilized (i.e., no floor heating system or in addition thereto), then venting system 10 of the present invention can be utilized to provide the heated air for heating the interior of the structure. In the embodiment shown in FIG. 4, the roof vent component of venting system 10 is a vent collector 98, which can be configured as or incorporated in the "Boston Ridge" arrangement shown, at the top end 14 of roof 12 that is configured to receive vented air 78 from air flow channel 36 after it passes around piping system 70 in gap 38 and warms the pipes 82 therein (for use as described above). In this configuration, the vent support member 40 and vents 50 described above are not utilized to vent vented air 78 from air flow channel 36. Instead, vent collector 98 distributes vented air 78 to a duct system 100 in the structure so that it may distribute interior air 102 inside the structure and warm the interior thereof. Use of venting system 10 in this manner will substantially reduce the cost and environmental impact of having to heat air for circulation inside the structure by reducing or eliminating the need to utilize a separate space heating system. If no cooling system, as explained below, is utilized with venting system 10, then it is preferred that vent collector 98 include valve 104, such as a thermostatically controlled flapper valve having a fan (i.e., 45 cfm fan), to allow vented air 78 to be vented outside of the structure when the vented air 78 is not desired or needed for heating the interior of the structure, such as during the summer months. In an alternative embodiment, not shown, vent system 10 includes both the vent support member 40 and vents 50 configuration described above and vent collector 98 and a control system to allow the owner/occupier of the structure to choose between venting vented air 78 out vents 50 or use vented air 78 for heating the interior of the structure. In another alternative embodiment, also not shown, venting system 10 utilizes the heated air supply system described above without the hot water configuration (i.e., piping system 70). As will be recognized by those skilled in the art, a "greener" roof system and a more environmentally friendly overall structure can be obtained by utilizing both the heated air and hot water configurations of venting system 10.

To improve the quality of interior air 102 going inside the structure, the preferred embodiment of venting system 10 of the present invention includes an air filter apparatus 106 in FIGS. 4 and 6. In the configuration shown in FIG. 4, air filter apparatus 106 is disposed in duct system 100 after vented air 78 is discharged from vent collector 98. As known to those skilled in the art, air filter apparatus 106 can be located elsewhere in venting system 10. For instance, air filter apparatus 106 can be located in vent collector 98, gap 38 or (as shown in FIG. 6) in air flow channel 36 to filter vented air as it moves through venting system 10. Various types of devices are suitable for air filter apparatus 106, including dry air filters such as HEPA filtration and micron filter devices, and various liquid filtration devices. In addition, air filter apparatus 36 can include an ultraviolet light system, such as those well known in the art, to remove bacteria from vented air 78 before it is discharged as interior air 102. Preferably, air filter apparatus 106 is located and configured so the owner, user or occupant of the structure can replace any replaceable components thereof without any undue difficulty. With air filter apparatus 106 in place, the warm interior air 102 being vented into the structure through duct system 100 will be somewhat to substantially better than most present systems for providing warm air to the interior of a structure. Because of venting system 10, this warm, healthier interior air 102 can be provided with substantially less cost and use of fuel and other environmental resources than present systems.

For use during the warmer summer months, venting system 10 can comprise an air cooling apparatus 108 disposed between vent collector 98 and the interior of the structure to convert the hot, dry vented air 78 into a cool interior air 102. Numerous air cooling devices are suitable for use for air cooling apparatus 108. Conventional coolant-type air cooling apparatuses 108 can be utilized for venting system 10. Alternatively, cooling apparatus 108 can comprise various concepts from the recently developed magnetic refrigerator technology that utilize a variety of alloys, such as a gadolinium-germanium-silicon alloy with a small amount of iron supplement added, to cool vented air 78 prior to entering the interior of the building. Various other types of air cooling systems can be utilized for air cooling apparatus 108. One type of cooling device that works particularly well with venting system 10 of the present invention is an evaporative air type of cooling system which passes the air to be cooled through wetted filters, thereby cooling the air. The typical roof type of evaporative air cooling system utilizes a square or rectangular shaped housing having four wettable pads on the sides thereof, a water distribution mechanism to spray or drip water onto the pads and a fan to draw outside air into the housing through the pads. As the air passes through the pads it is cooled by contact with the water in the pads. In the present invention, the air to be cooled is the vented air 78. Air cooling apparatus can comprise one or more pads that are connected to a source of water to wet the pads and cool vented air 78 as it passes therethrough before being discharged from duct system 100 as interior air 102. As is well known, the evaporative air type of air cooling apparatus 108 is most efficient when hot, dry air is passed through the wetted pads. In fact, this type of system is known not to work too well when the air to be cooled is humid. In the present invention, the vented air 78 passing through air flow channel 36 will be generally hot and dry, making it very suitable for use with an evaporative air cooling configuration as air cooling apparatus 108. The moisture formed because of the heat/cool of the day/night will be taken out from under upper roof layer 24, particularly when upper roof layer 24 is made from metal panels or shingles. As a result, roof venting system 10 will be in effect funneling hot, dry air to the evaporative cooling unit for cooling prior to entering the structure as interior air 102. The thermostatically controlled valve 104 facilitates the evacuation of the moisture laden air during the morning hours as the vented air 78 in air flow channel 36 begins to heat up. In a preferred embodiment, a solar powered fan is utilized with air cooling apparatus 108 to drive the vented air 78 through the pads or other cooling members of air cooling apparatus 108.

In another embodiment of the present invention, venting system 10 also comprises a electrical generating apparatus 110 that is configured to utilize the hot, dry vented air 78 to generate electricity therefrom. Electrical generating apparatus 110 can comprise a thermoacoustic engine to convert the heat from vented air 78 into acoustic power for a heat-driven electrical generator. The use of resonant macrosonic synthesis or RMS technology to convert harmonic sound waves into energy for operation of compressors, pumps, refrigeration, comfort air conditioning and as a natural gas converter for processing natural fuels into electrical power is still in its infancy stages. Likewise with the use of traveling-wave thermoacoustic heat engines. However, a number of such devices and uses for such devices have been developed by the Los Alamos National Laboratory and others. As this technology further develops, it may be able to be efficiently incorporated into the venting system of the present invention so as to improve the "green" quality thereof. To facilitate such use, the air can be further heated by an additional heating apparatus (not shown), such as a laser equipped space heater or like device that, preferably, uses a low amount of energy itself.

In the preferred embodiment of the present invention, roof venting system 10 comprises the use of roof vent components piping system 70, translucent section 88, water filtration apparatus 90, floor piping system 92, vent collector 98, air filter apparatus 106 and air cooling apparatus 108. Although various specific examples of these components are described above, those skilled in the art will readily recognize that equivalent function configurations or devices can be readily substituted into venting system 10 to obtain the benefits thereof. Venting system 10 of the present invention can be incorporated into the construction of a new structure or it can be retrofitted onto an existing structure (i.e., when it is necessary to repair or replace the structure's roof). Depending on the structure and the energy and hot water usage of the owner or occupant thereof, it may be economically beneficial to replace an existing roof, even if the existing roof is not in need of replacement. If retrofitting or placement of venting system 10 on the structure's roof is not able to be done, then the benefits of the venting system 10 of the present invention can be obtained by placing a secondary structure off from the main structure and incorporating the features of the present invention on the secondary structure. The basic configuration of the venting system 10 on the secondary structure would be the same as that described above, except that the hot water, warm air or cool air is transferred to the primary structure where it is used therein or thereby. In a preferred embodiment of this configuration, storage tank 77 could be larger (i.e., a 500 gallon tank) and placed at least partially in the ground where it will be insulated against temperature loss. In addition, if desired, an on-demand hot water heater can be included as a back-up to the system described above.

In use, the embodiment of roof venting system 10 described in FIGS. 4 through 6 provides an improved environmental, economic and health system for owners and occupiers of a structure. Air flows under the eave at bottom end 16 of roof 12 and through the intake vent 68 into air flow channel 36 disposed between lower roof layer 30 and upper roof layer 24. The vented air 78 will flow up towards top end 14 and pass across piping system 70, heating the water 80 flowing in pipes 82 thereof. Sunlight through translucent section 88 will further heat the water 80 flowing in piping system 70. Preferably, the water is filtered through water filtration apparatus 90 to remove impurities which can harm piping system 70 and/or to provide relatively pure water for use in the structure (i.e., showering, etc.). The heated water 80 can be used for a variety of household and commercial purposes, including washing, cleaning and the like. In the preferred embodiment, vented air 78 will then flow into vent collector 98 and be directed towards duct system 100. Air filter apparatus 106 will filter the air prior to being discharged through duct system as interior air 102, thereby improving the quality of air inside the structure. The interior air 102 can be heated air to warm the interior of the structure or venting system 10 can include an air cooling apparatus 108 to cool interior air 102 and, therefore, the interior of the structure. The air cooling apparatus 106 can include a solar powered fan to drive vented air 78 therethrough to the cool interior air 102. If desired, one or more storage tanks 77 can be utilized to store hot water until it is needed in the structure. To improve the ability of the tank 77 to maintain the temperature of the water, it can be partially or completely buried in the ground or otherwise insulated. If desired, the structure can include a floor piping system 92 that receives hot water 80 from venting system 10 so as to heat the interior space of the structure. During warm summer months, floor piping system 92 can receive cool or cold water to help in cooling the interior of the structure.

Figure 7:
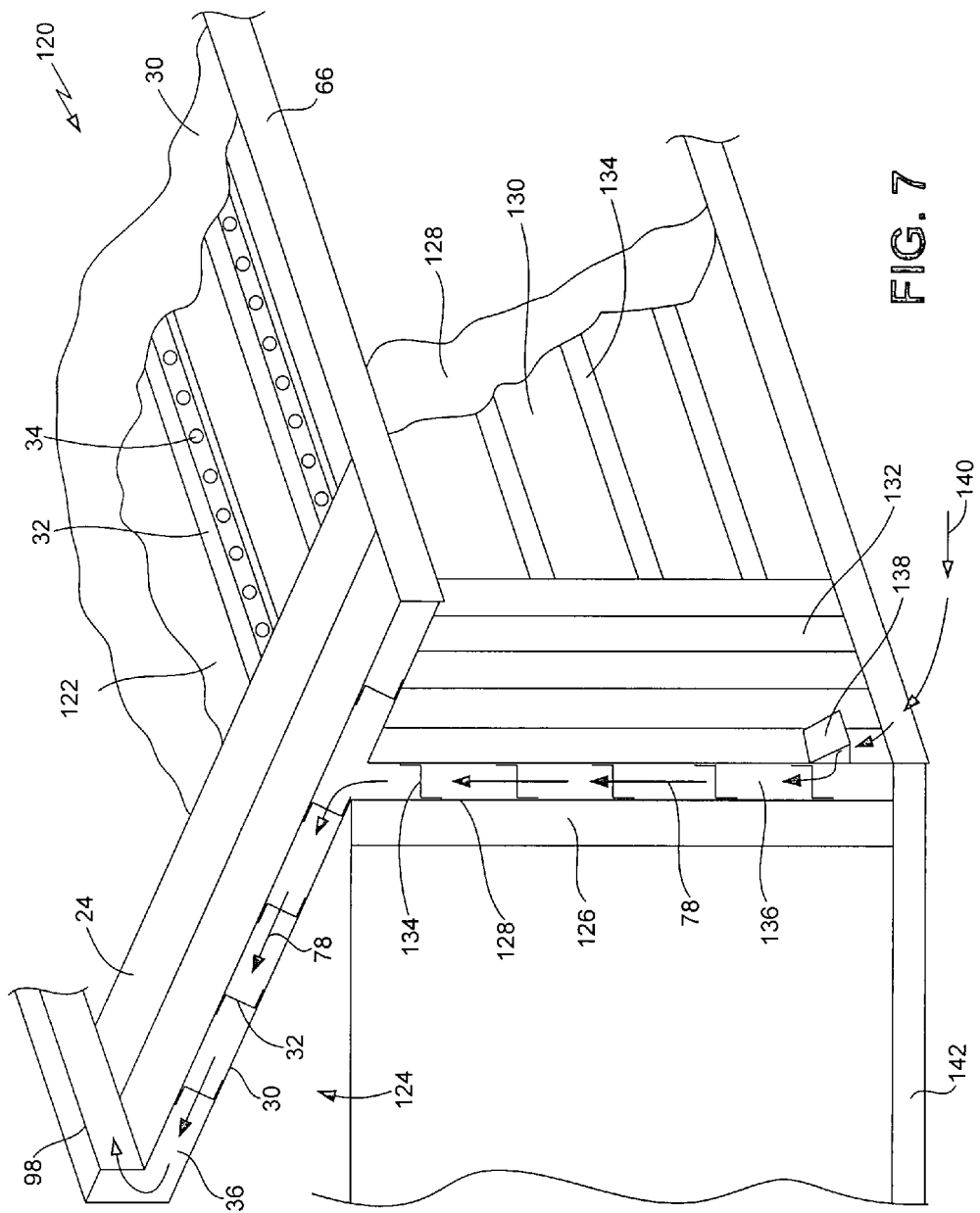
FIG. 7 is a partial cut-away side perspective view of a building having a vented wall and roof system configured according to one embodiment of the present invention.

An alternative configuration for a vented wall and roof system is shown in FIGS. 7 through 11. In these figures, the benefits of the providing an air flow channel 36 for the roof of a building are also applied to the building's exterior walls. As shown in FIG. 7, the vented wall and roof system, collectively identified as 120, comprises lower roof layer 30, upper roof layer 24 and a plurality of roof spacers 32 disposed therebetween to define air flow channel 36 through which vented air 78 flows to vented ridge 98 where the air is vented to the atmosphere and/or utilized as described above. In one embodiment, lower roof layer 30 is wooden and comprises an OSB (oriented strand board) sheathing or plywood material. In a preferred configuration, due to the heat convection properties, upper roof layer 24 comprises a plurality of metal roof sheets (i.e., standing seam) or like material. Alternatively, various other materials, including non-metal materials such as composition and like materials, can be utilized for upper roof layer 24. In one preferred configuration, spacers 32 comprises a metal, generally Z-shaped component having a plurality of holes 34, such as one and one-half inch diameter holes three inches on-center, disposed therein to allow vented air 78 to flow through air channel 36. As set forth above, various other shapes and materials can be utilized for spacers 32 and different configurations and spacing for holes 34. In this embodiment, the roof also includes a radiant barrier 122 disposed between the spacer 32 and the lower roof layer 32. In a preferred configuration, the radiant barrier 122 is selected to assist in blocking heat from the vented air 78 flowing through air channel 36 from transferring through lower roof layer 32 into the attic area 124 of the building and to provide a fireproof layer. Materials suitable for radiant barrier 122 are generally well known in the industry.

The vented wall and roof system 120 also comprises the generally vertical, planar building wall 126, on which is attached an inner wall layer 128, which can comprise a wood layer such as OSB sheathing or plywood. A wall radiant barrier 130 is placed over the inner wall layer 128 to, as generally with roof radiant barrier 122 for the roof, assist in preventing heat transfer into the interior of the building and to provide a fireproof layer. If desired, wall radiant barrier 130 can be the same or similar material as utilized for roof radiant barrier 122. The outer wall layer 132 can comprise metal, wood or composite siding sufficient to cover and protect the exterior of the building. Disposed between the inner wall layer 128 and outer wall layer 132, and generally horizontally extending (i.e., perpendicular to the vertical wall 126), are a plurality of wall spacers 134 that define wall air flow channel 136 between inner 128 and outer 132 wall layers. Wall spacers 134 are configured to maintain the outer wall layer 132 in spaced apart relation to the inner wall layer 128. As with the roof systems described above, in a preferred configuration wall spacers 134 comprise a metal, generally Z-shaped component having a plurality of holes therein (i.e., one and one-half inch diameter holes three inches on-center) to allow the vented air 78 to flow through the wall air flow channel 136 defined between the inner 128 and outer 132 wall layers. As with spacers 32, wall spacers 134 can be made into a variety of shapes and out of a variety of different materials and holes 34 can have different configurations and spacing.

The wall system of vented wall and roof system 120 also comprises a wall intake vent 138 for receiving exterior air, shown as 140, from the exterior of the building into wall air flow channel 136. In a preferred embodiment, wall intake vent 138 comprises a screen cover and/or a flapper valve mechanism (not specifically shown) to keep debris, bugs and small animals from entering into wall air flow channel 136. In one configuration, the vented wall and roof system 12 comprises a plurality of wall intake vents 138 disposed near the bottom of wall 126 (i.e., near foundation 142) and spaced apart approximately every ten feet or so to facilitate the entry of exterior air 140 into wall air flow channel 136. As shown in FIG. 7, exterior air 140 flows into wall intake vents 138 and then the vented air 78 flows upward through wall air flow channel 136 between inner 128 and outer 132 wall layers, into roof air flow channel 36 between upper 24 and lower 30 roof layers and then into vented ridge 98 where vented air 78 is vented to the atmosphere (alternatively, the vented air can be filtered and/or otherwise treated for use as interior air 102).

In an alternative configuration for the wall or roof systems of the vented wall and roof system 120, a rigid or semi-rigid layer of reflective foam board insulation can be utilized in place of the lower roof layer 30 and roof radiant barrier 122 and/or in place of the inner wall layer 128 and wall radiant barrier 130. An example of such materials is Astro-Board from RaTech Industries and Astro-Foil® from Pactiv Corp. Various other similarly configured materials can be used for the combined lower roof layer 30 and roof radiant barrier 122 and/or the combined inner wall layer 128 and wall radiant barrier 130 and, as such, are also suitable for use with vented wall and roof system 120.

The vented wall and roof system 120 shown in FIG. 7 is believed to be capable of venting approximately 70% or more of the heat that would otherwise be directed against the roof layer of a roof system not having the venting capabilities of the present invention (i.e., utilizing a two inch high Z-shaped spacers 32 and 134). The embodiments of FIGS. 8 and 9 are believed to improve the heat dissipating capabilities of the vented wall and roof system 120 of the present invention, such that upwards of 90% or more of the heat would be vented through vented ridge 98. Although FIGS. 8 and 9 refer to the components of the roof system and are provided with reference numerals that correspond thereto, those skilled in the art will readily understand that the description provided herein is equally as applicable to the corresponding components of the wall system and, therefore, the following discussion is intended to apply to both the roof and wall systems.

In the embodiment of FIG. 8, the wall and/or roof systems comprise a larger sized spacer 32 (i.e., a four inch spacer instead of a two inch spacer) that, at least nominally, provides a larger air flow channel. Welded on or otherwise attached at or near the center of the various spacers 32 are brackets 144, such as L-shaped angle irons, that are configured to support the ends of a generally rigid member, such as rigid insulation barrier 146, to define an outer air channel 148 and an inner air channel 150 through which flows an outer vented air flow 152 and an inner vented air flow 154, respectively. Various other apparatuses or devices can be utilized to support the rigid member 146 in a manner that defines the outer 148 and inner 150 air channels to direct the air flows 152/154 upward along wall 126 and/or along the roof installation 12. To ensure the integrity of the air channels 148/150, it is preferred that the ends of rigid member 146 are substantially sealed to prevent air flow, and therefore heat transfer, between the channels 148/150. In a preferred embodiment, this can be achieved by the use of an aluminum tape or the like (which is preferred to reduce the risk of fire transfer between the two channels) that is applied to the ends of rigid member 146 where they join spacer 32, such as at brackets 144. In an alternative embodiment, the ends of rigid member 146 can be joined directly to spacer 32 without the use of brackets 144 using various mechanisms or devices readily known to those skilled in the art. In addition, although not shown, the system of FIG. 8 can also include the roof radiant barrier 122 and/or wall radiant barrier 130 as described above.

In the embodiment of FIG. 9, the rigid member 146 (i.e., rigid insulation barrier) is supported in spaced apart relation above lower roof layer 30 on a plurality of lower space members 32b and upper roof layer 24 is supported in spaced apart relation above rigid member 146 to define outer air channel 148 and lower air channel 150. As with the above embodiments, both upper 32a and lower 32b spacer members have a plurality of holes 34 therein to allow vented air 78 to flow therethrough. Like the embodiment of FIG. 8, the use of multiple air channels through which vented air 78 passes is believed to substantially reduce the amount of heat that would be otherwise transferred into the attic area 124 of the building.

The embodiment of FIG. 10 shows an alternative configuration for the vented wall and roof system 120 of the present invention. In this particular embodiment, one of the air flow channels (in the figure, the outer air channel 148) is utilized to carry water or air in a downward direction, shown as arrow 156, so as to turn a vane-like apparatus 158 to generate electricity. In the embodiment shown, a water storage tank or other source of water 160 transfers water through discharge pipe 162 into the portion of outer air channel 148 having the vane-like apparatus 158. Water flows down through the outer air channel, turns the vane-like apparatus and generates electricity. Preferably, it will generally not be necessary or perhaps even advisable to convert all of the outer air channels 148 to this use. Instead, it will typically only be necessary to convert a few of such channels for use to generate electricity. Water in the tank 160 can be that which is for use in the building, water previously used in the building or it can be a rainwater collection tank to collect rainwater for this use. This type of system will be particularly beneficial for use in multistory buildings. In addition to the water flow system shown in FIG. 2, the vane apparatus 158 can also be placed in an air channel 148/150 such that it is rotated by the flow of air therethrough as a result of the standard venting operations described herein. To better facilitate the generation of electricity, one or more sections of the channels 148/150 that are designated for this use can be somewhat narrowed to increase the velocity of the vented air 78 past the vane apparatus 158.

Figure 11:
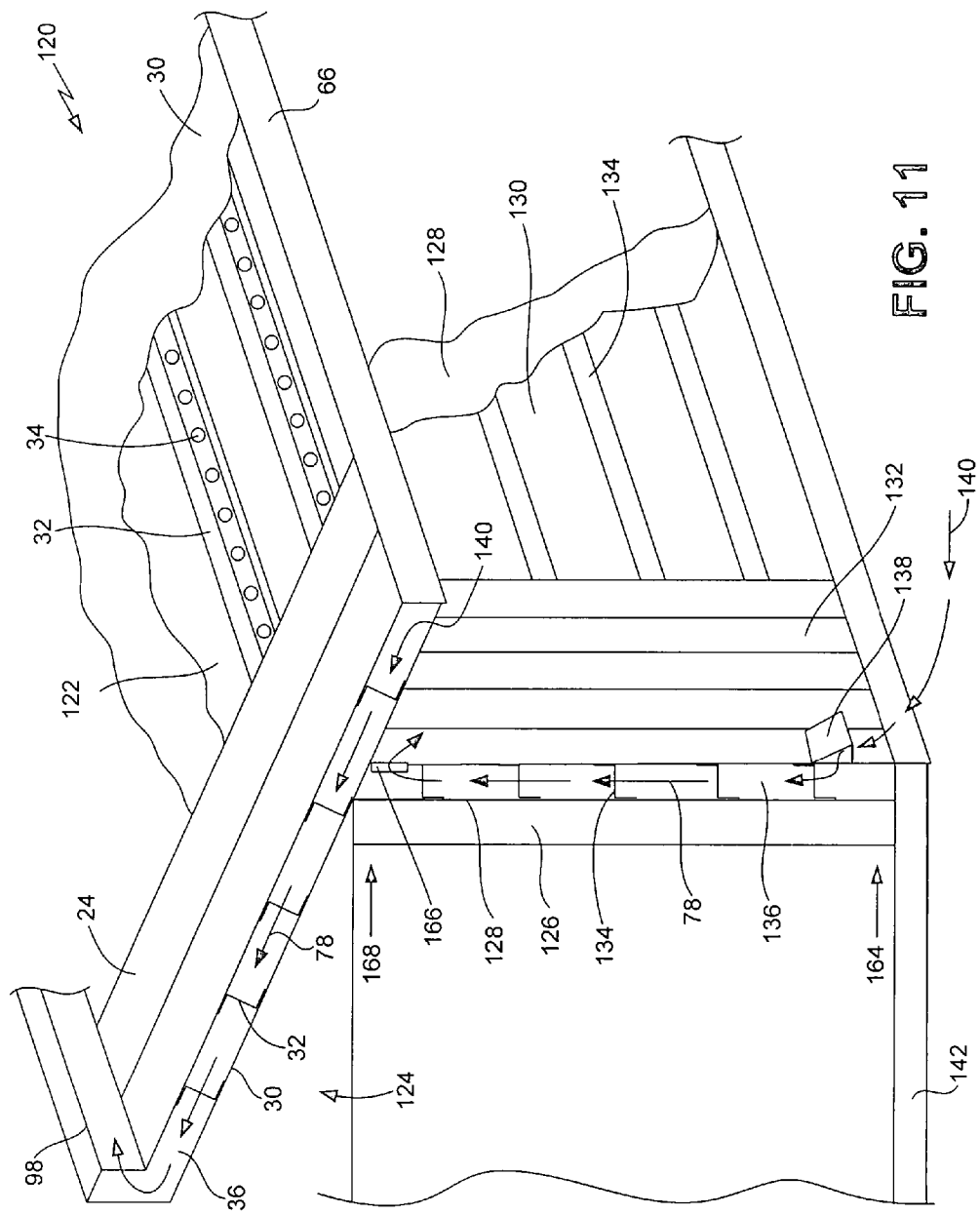
FIG. 11 is a partial cut-away side perspective view of a building having separate, non-connected vented wall and roof systems configured according to one embodiment of the present invention.

Although shown in FIG. 7 as being hydraulically connected to the roof venting system, the wall venting system can also be utilized without being connected to the roof, as shown in FIG. 11. The roof can be provided with the venting system 10 described above, with its own intake of exterior air 140, and the wall 126 can be provided with a similarly configured, but hydraulically separate, wall venting system (such as that shown in FIG. 7). In such a configuration, exterior air 140 would enter into the roof air flow channel 36 through the intake vent 68 at facia member 66 and exterior air 140 would enter into the wall air flow channel 136 at wall intake vent 138 generally at or near the bottom end 164 of wall 126. The vented air 78 from the roof system could be vented to the environment at ridge vent 98 or reused as described above. As shown in FIG. 11, the vented air 78 in wall air flow channel 136 is discharged through a discharge vent 166 at or near the top end 168 of wall 126. In the embodiment of FIG. 7, in contrast, the discharge vent 166 provides the connection between the wall air flow channel 136 and roof air flow channel 36 so the vented air can be used in the building or discharged from ridge vent 98 as described above for the roof venting system 10.

The vented wall and roof system 120 of the present invention is particularly beneficial for buildings having metal roofs and walls, although those buildings having roofs and walls made out of other materials, including composite materials, will also benefit from the present system 120. Typically, the benefits of the convection of the heated air upward through an air flow channel 36 in the roof benefits from the slope of the roof, with an increasing slope generally producing improved convection results. Because many metal roofs tend to have a low slope or pitch, suction fans or the like (particularly a small solar fan) can be utilized to pull air through air flow channel 36 to improve the flow of vented air 78 therein.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use. For instance, as is readily understood by those skilled in the art, there are numerous components described herein that can be replaced with equivalent functioning components to accomplish the objectives of the present invention.

What is claimed is:

1. A wall and roof venting system for a wall having a top end and a bottom end, said wall venting system comprising:
   an inner wall layer;
   an outer wall layer;
   one or more wall spacers disposed between said inner wall layer and said outer wall layer, said one or more wall spacers configured to maintain said outer wall layer in spaced apart relation to said inner wall layer and provide a wall air flow channel therebetween for receiving vented air from an exterior of the wall, each of said one or more wall spacers having one or more holes therein to facilitate air flow through said wall air flow channel, said vented air flowing generally from said bottom end to said top end of said wall through said wall air flow channel; and
   a discharge vent at said top end of said wall, said discharge vent configured to beneficially disperse and/or utilize said vented air from said air flow channel wherein said discharge vent discharges said vented air into a roof air flow channel disposed between a lower roof layer and an upper roof layer of a roof, said roof air flow channel configured to flow said vented air generally from a bottom end to a top end of said roof; wherein said roof air flow channel is defined by one or more roof spacers disposed between said lower roof layer and said upper roof layer, said roof spacers configured to maintain said upper roof layer in spaced apart relation to said lower roof layer, each of said one or more roof spacers having one or more holes therein to facilitate air flow through said roof air flow channel.

2. The wall and roof venting system according to claim 1, wherein said discharge vent discharges said vented air to the atmosphere.

3. The wall and roof venting system according to claim 1, wherein said upper roof layer further comprises a gap generally disposed at or near said top end of said roof and a roof vent component generally disposed at said gap, said roof vent component configured to beneficially disperse and/or utilize said vented air from said roof air flow channel.

4. The wall and roof venting system according to claim 3, wherein said roof vent component is in fluid flow communication with a duct system that distributes said vented air as interior air.

5. The wall and roof venting system according to claim 4 further comprising one or more fans on said upper roof layer and in fluid flow communication with said roof air flow channel.

6. The wall and roof venting system according to claim 5, wherein at least one of said fans is configured to draw vented air through said roof air flow channel.

7. The wall and roof venting system according to claim 5, wherein at least one of said fans is configured to discharge air into said air flow channel.

8. The wall and roof venting system according to claim 1, wherein said upper roof layer further comprises a gap generally disposed at or near said top end of said roof and a roof vent component generally disposed at said gap, said roof vent component configured to beneficially disperse and/or utilize said vented air from said roof air flow channel.

9. The wall and roof venting system according to claim 8, wherein said roof vent component is in fluid flow communication with a duct system that distributes said vented air as interior air.

10. The wall and roof venting system according to claim 1 further comprising a rigid member disposed between a pair of adjacent roof spacers, said rigid member defining a roof outer air channel and a roof inner air channel between said lower roof layer and said upper roof layer.

11. The wall and roof venting system according to claim 10 further comprising a rigid member disposed between a pair of adjacent wall spacers, said rigid member defining a wall outer air channel and a wall inner air channel between said inner wall layer and said outer roof layer.

12. The wall and roof venting system according to claim 11 further comprising a vane apparatus in at least one of said roof outer air channel, said roof inner air channel, said wall outer air channel and said wall inner air channel, said vane apparatus configured to generate electricity.

13. The wall and roof venting system according to claim 12, wherein said vane apparatus is hydraulically connected to a source of water configured to rotate said vane apparatus.

14. A wall and roof venting system for a wall having a top end and a bottom end and a roof having a top end and a bottom end, said wall venting system comprising:

an inner wall layer, an outer wall layer, one or more wall spacers disposed between said inner wall layer and said outer wall layer and a discharge vent at or near said top end of said wall, said one or more wall spacers configured to maintain said outer wall layer in spaced apart relation to said inner wall layer and provide a wall air flow channel therebetween for receiving vented air from the exterior of the wall, each of said one or more wall spacers having one or more holes therein to facilitate air flow through said wall air flow channel, said vented air flowing generally from said bottom end to said top end of said wall through said wall air flow channel, said discharge vent configured to beneficially disperse and/or utilize said vented air from said wall air flow channel; and a lower roof layer, an upper roof layer, one or more roof spacers disposed between said lower roof layer and said upper roof layer, a gap generally disposed at or near a top end of said roof and a roof vent component generally disposed at said gap, said roof spacers configured to maintain said upper roof layer in spaced apart relation to said lower roof layer and define a roof air flow channel therebetween, each of said one or more roof spacers having one or more holes therein to facilitate air flow through said roof air flow channel, said roof air flow channel configured to flow said vented air generally from a bottom end to said top end of said roof, said roof vent component configured to beneficially disperse and/or utilize said vented air from said roof air flow channel.

15. The wall and roof venting system according to claim 14, wherein said roof vent component is in fluid flow communication with a duct system that distributes said vented air as interior air.

16. The wall and roof venting system according to claim 14 further comprising a rigid member disposed between a pair of adjacent roof spacers to define a roof outer air channel and a roof inner air channel between said lower roof layer and said upper roof layer and/or disposed between a pair of adjacent wall spacers to define a wall outer air channel and a wall inner air channel between said inner wall layer and said outer wall layer.

* * * * *

(12) EX PARTE REEXAMINATION CERTIFICATE (8518th)
United States Patent
Cooper et al.

(10) Number: US 7,565,775 C1
(45) Certificate Issued: Sep. 6, 2011

(54) VENTED ROOF AND WALL SYSTEM

(75) Inventors: John Cooper, Squaw Valley, CA (US); Woodrow Wilson, Clovis, CA (US)

(73) Assignee: Cool Building System, Inc., San Antonio, TX (US)

Reexamination Request:
No. 90/011,172, Aug. 23, 2010

Reexamination Certificate for:
Patent No.: 7,565,775
Issued: Jul. 28, 2009
Appl. No.: 11/820,042
Filed: Jun. 18, 2007

Related U.S. Application Data

(63) Continuation-in-part of application No. 11/134,534, filed on May 20, 2005, now Pat. No. 7,231,744.
(60) Provisional application No. 60/586,692, filed on Jul. 8, 2004.

(51) Int. Cl.
*E04B 7/00* (2006.01)
*E04H 12/28* (2006.01)

(52) U.S. Cl. .................. 52/199; 52/302.1; 52/302.3; 52/131; 52/508; 52/95; 52/72

(58) Field of Classification Search .................. None
See application file for complete search history.

(56) References Cited

U.S. PATENT DOCUMENTS

| 3,683,785 | A | 8/1972 | Grange |
| 4,624,300 | A | 11/1986 | Stubbolo |
| 4,741,391 | A | 5/1988 | Schmitz |
| 6,041,596 | A | 3/2000 | Royer |
| 6,210,113 | B1 | 4/2001 | Ihrenberger |
| 7,231,744 | B2 | 6/2007 | Cooper et al. |
| 2006/0005491 | A1 * | 1/2006 | Cooper et al. .............. 52/302.1 |

FOREIGN PATENT DOCUMENTS

GB          805978          4/1958

* cited by examiner

*Primary Examiner*—Catherine S. Williams

(57) ABSTRACT

A wall and roof venting system comprising a wall having an outer layer disposed outwardly of an inner layer with a plurality of spacers disposed therebetween to provide a wall air flow channel between the wall layers. Exterior air enters at the bottom of the wall and vented air is discharged near the top of the wall to reduce heat transfer into the building. Preferably, vented air flows into a roof air flow channel disposed between a first roof layer and a second roof layer maintained in spaced apart relation by a plurality of roof spacers therebetween. A vent component is disposed in a gap in the upper roof layer at or near the top end of the roof to beneficially disperse and/or utilize the vented air from the air flow channels. The wall and roof spacers have openings therein to permit vented air to flow through the respective channels.

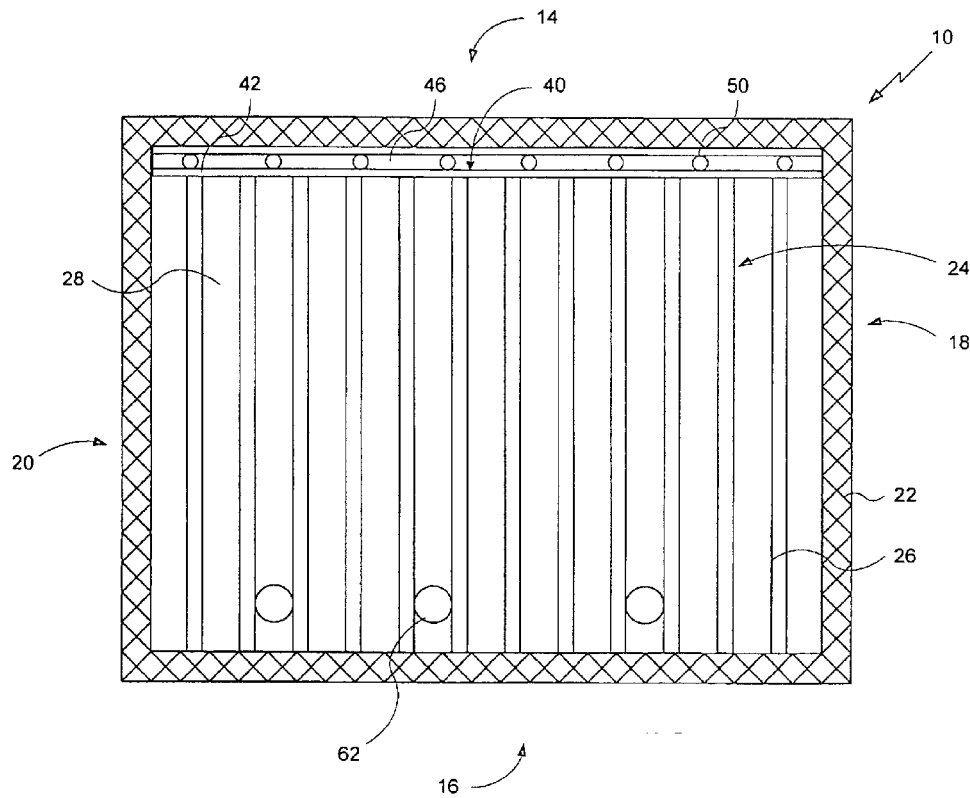

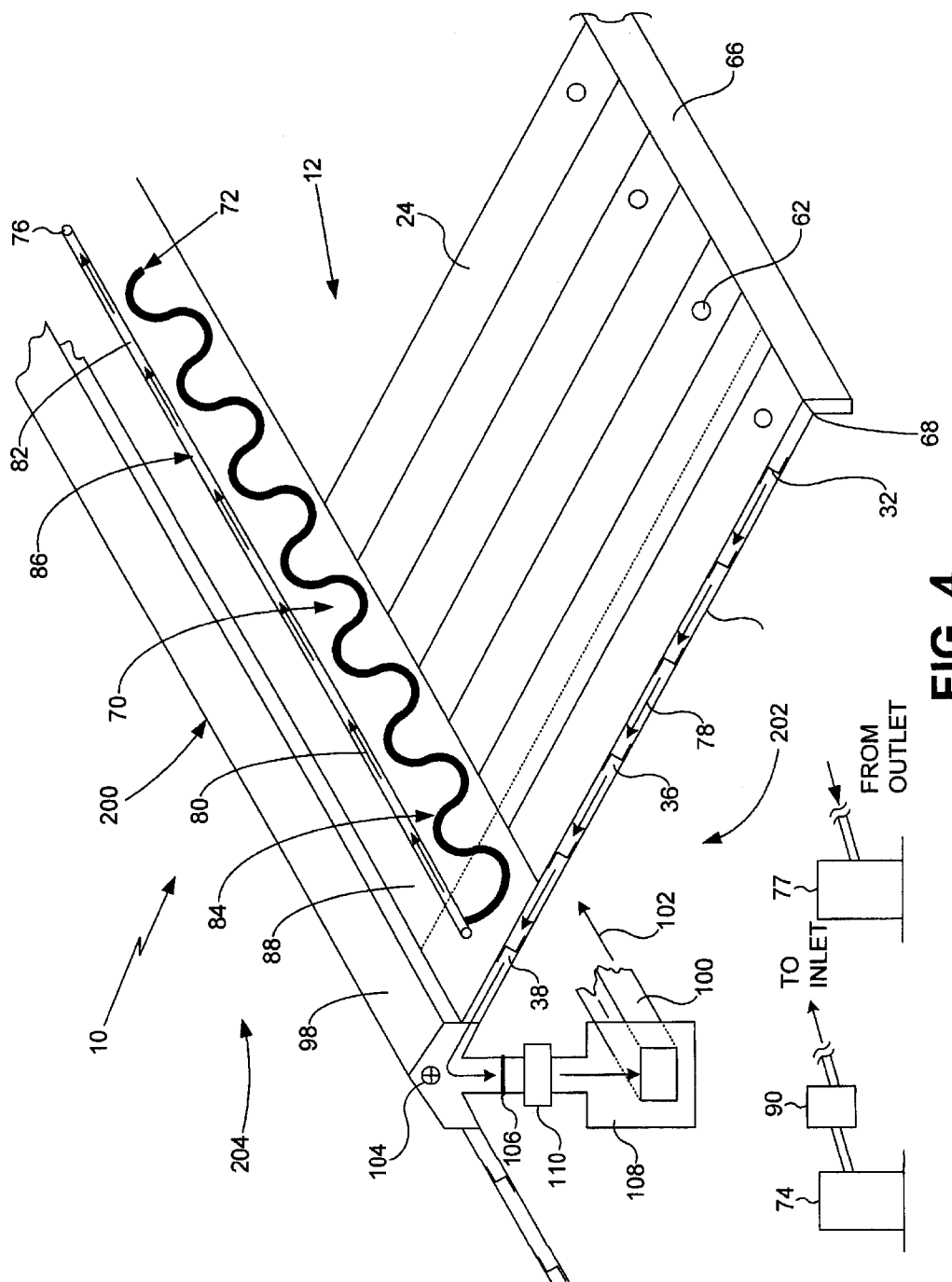
FIG. 4
Amended

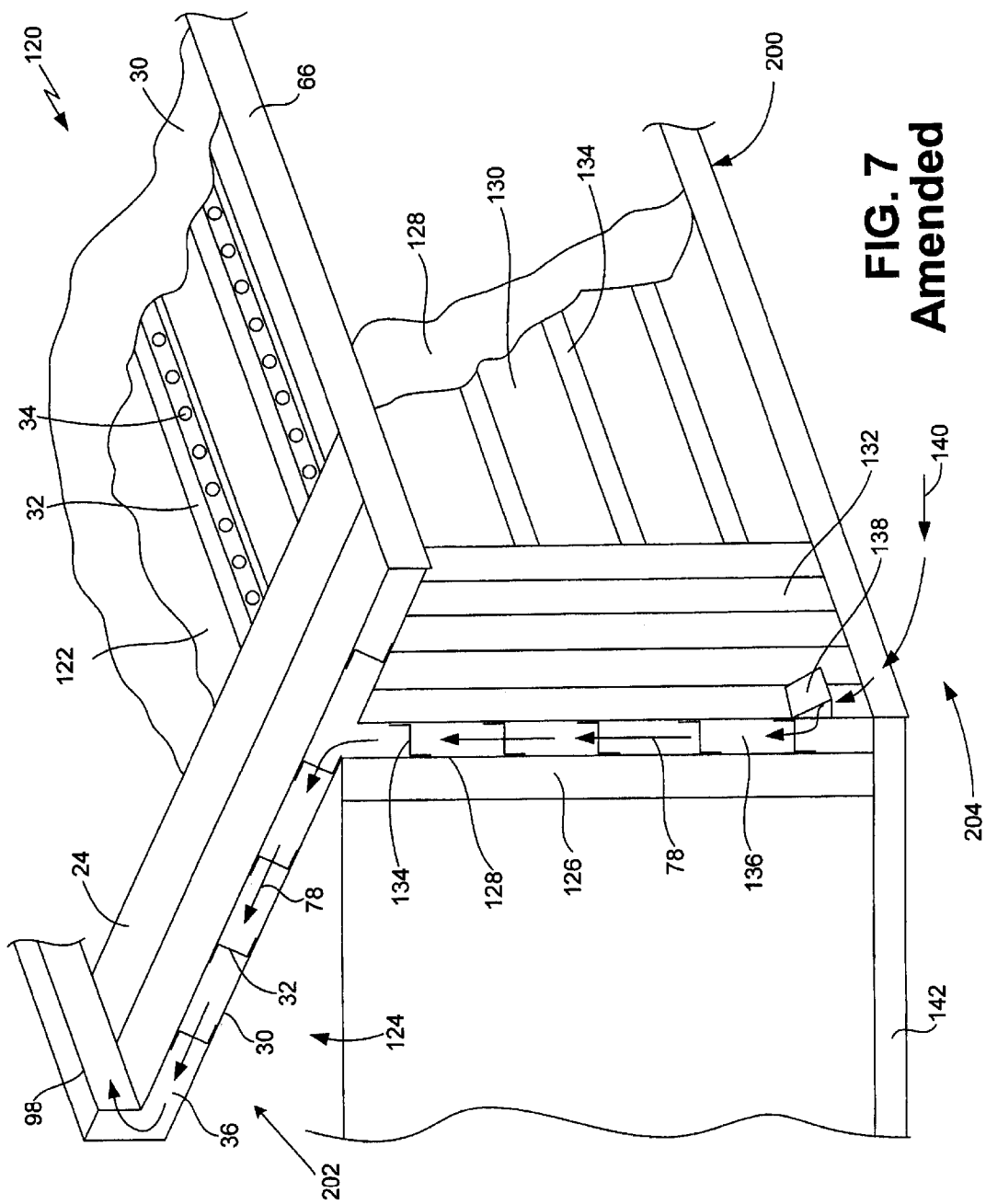
FIG. 7
Amended

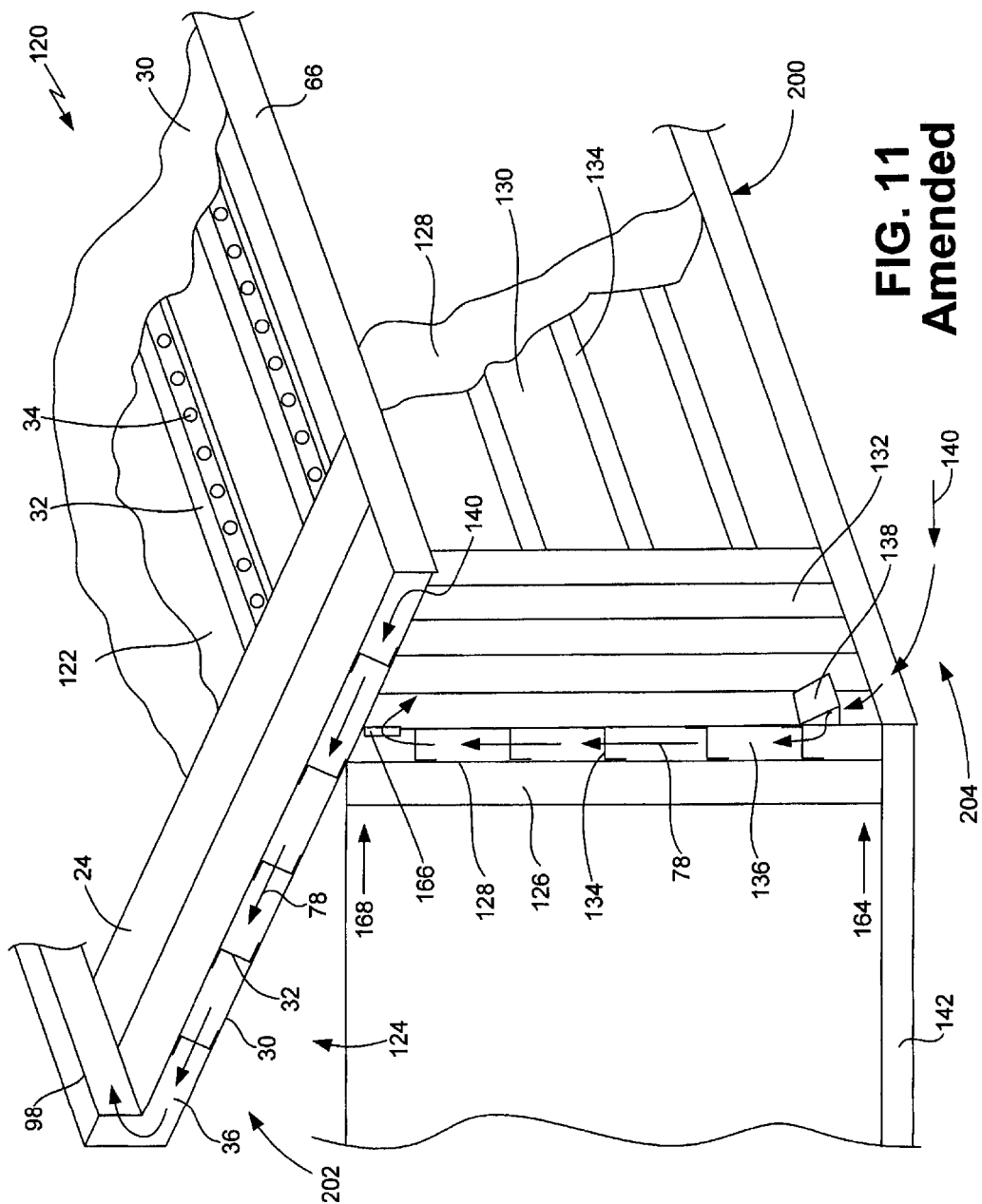
FIG. 11 Amended

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 6-9:

This application [claims the benefit] *is a continuation-in-part* of U.S. Patent Application Ser. No. 11/134,534 filed May 20, 2005, which issued as U.S. Pat. No. 7,231,744 on Jun. 19, 2007, which claimed the benefit of U.S. Provisional Application No. 60/586,692 filed Jul. 8, 2004.

Column 13, line 52-column 14, line 23:

If a conventional heating system is utilized (i.e., no floor heating system or in addition thereto), then venting system 10 of the present invention can be utilized to provide the heated air for heating the interior 202 of the structure 200. In the embodiment shown in FIG. 4, the roof vent component of venting system 10 is a vent collector 98, which can be configured as or incorporated in the "Boston Ridge" arrangement shown, at the top end 14 of roof 12 that is configured to receive vented air 78 from flow channel 36 after it passes around piping system 70 in gap 38 and warms the pipes 82 therein (for use as described above). In this configuration, the vent support member 40 and vents 50 described above are not utilized to vent vented air 78 from air flow channel 36. Instead, vent collector 98 distributes vented air 78 to a duct system 100 in the structure 200 so that it may distribute interior air 102 inside the structure 200 and warm the interior 202 thereof. Use of venting system 10 in this manner will substantially reduce the cost and environmental impact of having to heat air for circulation inside the structure 200 by reducing or eliminating the need to utilize a separate space heating system *for interior 202*. If no cooling system, as explained below, is utilized with venting system 10, then it is preferred that vent collector 98 include valve 104, such as a thermostatically controlled flapper valve having a fan (i.e, 45 cfm fan), to allow vented air 78 to be vented outside of the structure 200 when the vented air 78 is not desired or needed for heating the interior 202 of the structure 200, such as during the summer months. In an alternative embodiment, not shown, vent system 10 includes both the vent support member 40 and vents 50 configuration described above and vent collector 98 and a control system to allow the owner/occupier of the structure 200 to choose between venting vented air 78 out vents 50 or use vented air 78 for heating the interior 202 of the structure 200. In another alternative embodiment, also not shown, venting system 10 utilizes the heated air supply system described above without the hot water configuration (i.e., piping system 70). As will be recognized by those skilled in the art, a "greener" roof system and a more environmentally friendly overall structure 200 can be obtained by utilizing both the heated air and hot water configurations of venting system 10.

Column 14, lines 24-50:

To improve the quality of interior air 102 going [inside] *into the interior 202 of* the structure 200, the preferred embodiment of venting system 10 of the present invention includes an air filter apparatus 106 in FIGS. 4 and 6. In the configuration shown in FIG. 4, air filter apparatus 106 is disposed in duct system 100 after vented air 78 is discharged from vent collector 98. As known to those skilled in the art, air filter apparatus 106 can be located elsewhere in venting system 10. For instance, air filter apparatus 106 can be located in vent collector 98, gap 38 or (as shown in FIG. 6) in air flow channel 36 to filter vented air as it moves through venting system 10. Various types of devices are suitable for air filter apparatus 106, including dry air filters such as HEPA filtration and micron filter devices, and various liquid filtration devices. In addition, air filter apparatus 36 can include an ultraviolet light system, such as those well known in the art, to remove bacteria from vented air 78 before it is discharged as interior air 102. Preferably, air filter apparatus 106 is located and configured so the owner, user or occupant of the structure 200 can replace any replaceable components thereof without any undue difficulty. With air filter apparatus 106 in place, the warm interior air 102 being vented into the *interior 202 of* structure 200 through duct system 100 will be somewhat to substantially better than most present systems for providing warm air to the interior 202 of a structure 200. Because of venting system 10, this warm, healthier interior air 102 can be provided with substantially less cost and use of fuel and other environmental resources than present systems.

Column 14, line 51-column 15, line 31:

For use during the warmer summer months, venting system 10 can comprise an air cooling apparatus 108 disposed between vent collector 98 and the interior 202 of the structure 200 to convert the hot, dry vented air 78 into a cool interior air 102. Numerous air cooling devices are suitable for use for air cooling apparatus 108. Conventional coolant-type air cooling apparatuses 108 can be utilized for venting system 10. Alternatively, cooling apparatus 108 can comprise various concepts from the recently developed magnetic refrigerator technology that utilize a variety of alloys, such as a gadolinium-germanium-silicon alloy with a small amount of iron supplement added, to cool vented air 78 prior to entering the interior 202 of the [building] *structure 200*. Various other types of air cooling systems can be utilized for air cooling apparatus 108. One type of cooling device that works particularly well with venting system 10 of the present invention is an evaporative air type of cooling system which passes the air to be cooled through wetted filters, thereby cooling the air. The typical roof type of evaporative air cooling system utilizes a square or rectangular shaped housing having four wettable pads on the sides thereof, a water distribution mechanism to spray or drip water onto the pads and a fan to draw outside air into the housing through the pads. As the air passes through the pads it is cooled by contact with the water in the pads. In the present invention, the air to be cooled is the vented air 78. Air cooling apparatus can comprise one or more pads that are connected to a source of water to wet the pads and cool vented air 78 as it passes therethrough before being discharged from duct system 100 as interior air 102. As is well known, the evaporative air type of air cooling apparatus 108 is most efficient when hot, dry air is passed through the wetted pads. In fact, this type of system is known not to work too well when the air to be cooled is humid. In the present invention, the vented air 78 passing through air flow channel 36 will be generally hot and dry, making it very suitable for use with an evaporative air cooling configuration as air cooling apparatus 108. The moisture formed because of the heat/cool of the day/night will be taken out from under upper roof layer 24, particularly when upper roof layer 24 is made from metal panels or shingles. As a result, roof venting system 10 will be in effect funneling hot, dry air to the evaporative cooling unit for cooling prior to entering the *interior 202 of* structure *200* as interior air 102. The thermostatically controlled valve 104 facilitates the evacuation of the moisture laden air during the morning hours as the vented air 78 in air flow channel 36 begins to heat up. In a preferred embodiment, a solar powered fan is utilized with air cooling apparatus 108 to drive the vented air 78 through the pads or other cooling members of air cooling apparatus 108.

Column 16, lines 17-51:

In use, the embodiment of roof venting system 10 described in FIGS. 4 through 6 provides an improved environmental, economic and health system for owners and occupiers of a structure *200*. Air flows under the eave at bottom end 16 of roof 12 and through the intake vent 68 into air flow channel 36 disposed between lower roof layer 30 and upper roof layer 24. The vented air 78 will flow up towards top end 14 and pass across piping system 70, heating the water 80 flowing in pipes 82 thereof. Sunlight through translucent section 88 will further heat the water 80 flowing in piping system 70. Preferably, the water is filtered through water filtration apparatus 90 to remove impurities which can harm piping system 70 and/or to provide relatively pure water for use in the structure *200* (i.e., showering, etc.). The heated water 80 can be used for a variety of household and commercial purposes, including washing, cleaning and the like. In the preferred embodiment, vented air 78 will then flow into vent collector 98 and be directed towards duct system 100. Air filter apparatus 106 will filter the air prior to being discharged through duct system *into interior 202* as interior air 102, thereby improving the quality of air inside the structure *200*. The interior air 102 can be heated air to warm the interior *202* of the structure *200* or venting system 10 can include an air cooling apparatus 108 to cool interior air 102 and, therefore, the interior *202* of the structure *200*. The air cooling apparatus 106 can include a solar powered fan to drive vented air 78 therethrough to the cool interior air 102. If desired, one or more storage tanks 77 can be utilized to store hot water until it is needed in the structure *200*. To improve the ability of tha tank 77 to maintain the temperature of the water, it can be partially or completely buried in the ground or otherwise insulated. If desired, the structure *200* can include a floor piping system 92 that receives hot water 80 from venting system 10 so as to heat the interior [space] *202* of the structure *200*. During warm summer months, floor piping system 92 can receive cool or cold water to help in cooling the interior *202* of the structure *200*.

Column 17, lines 17-43:

The vented wall and roof system 120 also comprises the generally vertical, planar building wall 126, on which is attached an inner wall layer 128, which can comprise a wood layer such as OSB sheathing or plywood. A wall radiant barrier 130 is placed over the inner wall layer 128 to, as generally with roof radiant barrier 122 for the roof, assist in preventing heat transfer into the interior *202* of the [building] *structure 200* and to provide a fireproof layer. If desired, wall radiant barrier 130 can be the same or similar material as utilized for roof radiant barrier 122. The outer wall layer 132 can comprise metal, wood or composite siding sufficient to cover and protect the exterior of the [building] *structure 200*. Disposed between the inner wall layer 128 and outer wall layer 132, and generally horizontally extending (i.e, perpendicular to the vertical wall 126), are a plurality of wall spacers 134 that define wall air flow channel 136 between inner 128 and outer 132 wall layers. Wall spacers 134 are configured to maintain the outer wall layer 132 in spaced apart relation to the inner wall layer 128. As with the roof systems described above, in a preferred configuration wall spacers 134 comprise a metal, generally Z-shaped component having a plurality of holes therein (i.e., one and one-half inch diameter holes three inches on-center) to allow the vented air 78 to flow through the wall air flow channel 136 defined between the inner 128 and outer 132 wall layers. As with spacers 32, walls spacers 134 can be made into a variety of shapes and out of a variety of different materials and holes 34 can have different configurations and spacing.

Column 17, line 44-62:

The wall system of vented wall and roof system 120 also comprises a wall intake vent 138 *that is open to the exterior 204 of structure 200* for receiving exterior air, shown as 140, from the exterior *204* of the [building] *structure* into wall air flow channel 136, *as shown in FIGS. 7 and 11*. In a preferred embodiment, wall intake vent 138 comprises a screen cover and/or a flapper valve mechanism (not specifically shown) to keep debris, bugs and small animals from entering into wall air flow channel 136 *from the exterior 204 of structure 200*. In one configuration, the vented wall and roof system 12 comprises a plurality of wall intake vents 138 disposed near the bottom of wall 126 (i.e., near foundation 142) and spaced apart approximately every ten feet or so to facilitate the entry of exterior air 140 *from the exterior 204 of structure 200* into wall air flow channel 136. As shown in FIG. 7, exterior air 140 flows into wall intake vents 138 *from the exterior 204 of structure 200* and then the vented air 78 flows upward through wall air flow channel 136 between inner 128 and outer 132 wall layers, into roof air flow channel 36 between upper 24 and lower 30 roof layers and then into vented ridge 98 where vented air 78 is vented to the atmosphere (alternatively, the vented air can be filtered and/or otherwise treated for use as interior air 102 *in the interior 202 of structure 200*).

THE DRAWING FIGURES HAVE BEEN CHANGED AS FOLLOWS:

Reference numerals 200, 202 and 204 have been added to Figures 4, 7 and 11.

AS A RESULT OF REEXAMINATION, IT HAS BEEN DETERMINED THAT:

Claims 3-4, 8-9 and 15 are cancelled.

Claims 1, 5, 11, 14 and 16 are determined to be patentable as amended.

Claims 2, 6-7, 10 and 12-13, dependent on an amended claim, are determined to be patentable.

New claims 17-24 are added and determined to be patentable.

1. A wall and roof venting system for a wall having a top end and a bottom end, said wall *and roof* venting system comprising:

an inner wall layer;

an outer wall layer;

one or more wall spacers disposed between said inner wall layer and said outer wall layer, said one or more wall spacers configured to maintain said outer wall layer in spaced apart relation to said inner wall layer and provide a wall air flow channel therebetween for receiving vented air from an exterior of the wall, each of said one or more wall spacers having one or more holes therein to facilitate air flow through said wall air flow channel, said vented air flowing generally from said bottom end to said top end of said wall through said wall air flow channel; [and]

a discharge vent at said top end of said wall, said discharge vent configured to beneficially disperse and/or utilize said vented air from said air flow channel wherein said discharge vent discharges said vented air into a roof air flow channel disposed between a lower roof layer and an upper roof layer of a roof, said roof air flow channel configured to flow said vented air generally from a bottom end to a top end of said roof; wherein said roof air flow channel is defined by one or more roof spacers disposed between said lower roof layer and said upper roof layer, said roof spacers configured to maintain said upper roof layer in spaced apart relation to said lower roof layer, each of said one or more roof spacers having one or more holes therein to facilitate air flow through said roof air flow channel; and a roof vent component generally disposed at a gap in said upper roof layer, said gap generally disposed at or near said top end of said roof, said roof vent component configured to beneficially disperse and/or utilize said vented air from said roof air flow channel, said roof vent component in fluid flow communication with a duct system that distributes said vented air as interior air.

5. The wall and roof venting system according to claim [4] *1* further comprising one or more fans on said upper roof layer and in fluid flow communication with said roof air flow channel.

11. The wall and roof venting system according to claim 10 further comprising a rigid member disposed between a pair of adjacent wall spacers, said rigid member defining a wall outer air channel and a wall inner air channel between said inner wall layer and said outer [roof] *wall* layer.

14. A wall and roof venting system for a wall having a top end and a bottom end and a roof having a top end and a bottom end, said wall *and roof* venting system comprising:

an inner wall layer, an outer wall layer, one or more wall spacers disposed between said inner wall layer and said outer wall layer and a discharge vent at or near said top end of said wall, said one or more wall spacers configured to maintain said outer wall layer in spaced apart relation to said inner wall layer and provide a wall air flow channel therebetween for receiving vented air from the exterior of the wall, each of said one or more wall spacers having one or more holes therein to facilitate air flow through said wall air flow channel, said vented air flowing generally from said bottom end to said top end of said wall through said wall air flow channel, said discharge vent configured to beneficially disperse and/or utilize said vented air from said wall air flow channel; and a lower roof layer, an upper roof layer, one or more roof spacers disposed between said lower roof layer and said upper roof layer, a gap generally disposed at or near a top end of said roof and a roof vent component generally disposed at said gap, said roof spacers configured to maintain said upper roof layer in spaced apart relation to said lower roof layer and define a roof air flow channel therebetween, each of said one or more roof spacers having one or more holes therein to facilitate air flow through said roof air flow channel, said roof air flow channel configured to flow said vented air generally from a bottom end to said top end of said roof, said roof event component configured to beneficially disperse and/or utilize said vented air from said roof air flow channel, *said roof vent component in fluid flow communication with a duct system that distributes said vented air as interior air.*

16. The wall and roof venting system according to claim [14] *15* further comprising a rigid member disposed between a pair of adjacent roof spacers to define a roof outer air channel and a roof inner air channel between said lower roof layer and said upper roof layer and/or disposed between a pair of adjacent wall spacers to define a wall outer air channel and a wall inner air channel between said inner wall layer and said outer wall layer.

*17. A wall and roof venting system for a structure having a wall with a top end and a bottom end and a roof with a top end and a bottom end, said wall and roof defining an interior of said structure separated thereby from the atmosphere at an exterior of said structure, said wall and roof venting system comprising:*

*an inner wall layer of said wall disposed toward said inerior;*

*an outer wall layer of said wall disposed toward said exterior;*

*one or more wall spacers disposed between said inner wall layer and said outer wall layer so as to maintain said outer wall layer in spaced apart relation to said inner wall layer and define a wall air flow channel therebetween for receiving exterior air from the atmosphere at said exterior of said structure through a wall intake vent open to said exterior of said structure, each of said one or more wall spacers having one or more holes therein to facilitate flow of vented air through said wall air flow channel, said vented air flowing generally from said bottom end to said top end of said wall through said wall air flow channel; and*

*a discharge vent at said top end of said wall, said discharge vent configured to direct said vented air from said wall air flow channel into a roof air flow channel disposed between a lower roof layer and an upper roof layer of said roof, said roof air flow channel configured to flow said vented air generally from said bottom end to said top end of said roof, said roof air flow channel defined by one or more roof spacers disposed between said lower roof layer and said upper roof layer, said roof spacers configured to maintain said upper roof layer in spaced apart relation to said lower roof layer, each of said one or more roof spacers having one or more holes therein to facilitate flow of vented air through said roof air flow channel.*

*18. The wall and roof venting system according to claim 17, wherein said upper roof layer further comprises a gap generally disposed at or near said top end of said roof and a roof vent component generally disposed at said gap, said roof vent component configured to beneficially disperse and/ or utilize said vented air from said roof air flow channel, said roof vent component in fluid flow communication with a duct system that distributes said vented air as interior air.*

*19. The wall and roof venting system according to claim 17 further comprising one or more fans on said upper roof layer and in fluid flow communication with said roof air flow channel so as to draw vented air through said roof air flow channel.*

*20. The wall and roof venting system according to claim 17 further comprising one or more fans on said upper roof layer and in fluid flow communication with said roof air flow channel so as to discharge atmosphere air from said exterior into said roof air flow channel.*

21. The wall and roof venting system according to claim 17 further comprising a roof outer air channel and a roof inner air channel disposed between said lower roof layer and said upper roof layer, a wall outer air channel and a wall inner air channel between said inner wall layer and said outer wall layer and a vane apparatus in communication with at least one of said roof outer air channel, said roof inner air channel, said wall outer air channel and said wall inner air channel, said vane apparatus configured to generate electricity.

22. The wall and roof venting system according to claim 21, wherein said vane apparatus is hydraulically connected to a source of water configured to rotate said vane apparatus.

23. A wall and roof venting system, comprising:

a wall having a bottom end, a top end, an inner wall layer, an outer wall layer and a rigid member disposed between said inner wall layer and said outer wall layer so as to define a wall inner air channel and a wall outer air channel between said inner wall layer and said outer wall layer, said wall inner air channel and said wall outer air channel for receiving vented air from an exterior of said wall, said vented air flowing generally from said bottom end to said top end of said wall through said wall inner air channel and said wall outer air channel;

a plurality of wall spacers disposed in each of said wall inner air channel and said wall outer air channel, said wall spacers in said inner air channel configured to maintain said inner wall layer in spaced apart relation to said rigid member, said wall spacers in said outer air channel configured to maintain said outer wall layer in spaced apart relation to said rigid member, each of said wall spacers having one or more holes therein to facilitate air flow through said inner air channel and said outer wall channel;

a roof having a bottom end, a top end, a lower roof layer, an upper roof layer and a rigid member disposed between said lower roof layer and said upper roof layer so as to define a roof upper air channel and a roof lower air channel between said lower roof layer and said upper roof layer;

a plurality of roof spacers disposed in each of said roof lower air channel and said roof upper air channel, said roof spacers in said roof lower air channel configured to maintain said lower roof layer in spaced apart relation to said rigid member, said roof spacers in said roof upper air channel configured to maintain said upper roof layer in spaced apart relation to said rigid member, each of said roof spacers having one or more holes therein to facilitate air flow through said roof lower air channel and said roof upper air channel;

a discharge vent at said top end of said wall, said discharge vent configured to beneficially disperse and/or utilize said vented air from said wall inner air channel and/or said wall outer air channel, wherein said discharge vent discharges said vented air into said roof lower air channel and/or said roof upper air channel so as to flow said vented air generally from said bottom end to said top end of said roof; and a vane apparatus in at least one of said roof outer air channel, said roof inner air channel, said wall outer air channel and said wall inner air channel, said vane apparatus configured to generate electricity.

24. The wall and roof venting system according to claim 23, wherein said vane apparatus is hydraulically connected to a source of water configured to rotate said vane apparatus.

* * * * *